United States Patent [19]

Komiya et al.

[11] Patent Number: 5,070,353
[45] Date of Patent: * Dec. 3, 1991

[54] AUTOMATIC FOCUSING APPARATUS

[75] Inventors: Yasuhiro Komiya, Hachioji; Tatsuo Nagasaki, Yokohama, both of Japan

[73] Assignee: Olympus Optical Co., Ltd., Tokyo, Japan

[*] Notice: The portion of the term of this patent subsequent to Feb. 5, 2008 has been disclaimed.

[21] Appl. No.: 618,463

[22] Filed: Nov. 27, 1990

Related U.S. Application Data

[63] Continuation of Ser. No. 458,166, Dec. 28, 1989, Pat. No. 4,998,416.

[30] Foreign Application Priority Data

Jan. 9, 1989 [JP] Japan ..................... 1-2483
Dec. 8, 1989 [JP] Japan ..................... 1-317738

[51] Int. Cl.$^5$ ............................................. G03B 13/00
[52] U.S. Cl. ................................ 354/402; 358/227
[58] Field of Search .................... 354/400-409; 250/201, 204; 358/227

[56] References Cited

U.S. PATENT DOCUMENTS 4,561,749 12/1985 Utagawa ..................... 354/406
4,812,636 3/1989 Kusaka et al. ................ 354/408
4,990,947 2/1991 Komiya et al. ............... 354/402

FOREIGN PATENT DOCUMENTS 62-284314 12/1987 Japan.
63-127217 5/1988 Japan.

Primary Examiner—L. T. Hix
Assistant Examiner—David M. Gray
Attorney, Agent, or Firm—Frishauf, Holtz, Goodman & Woodward

[57] ABSTRACT

An automatic focusing apparatus comprises a photographic optical system for forming an optical image of an object, an optical system driving circuit for moving the photographic optical system in a direction of its optical axis, a storage circuit for prestoring a plurality of MTF ratios corresponding to a plurality of focusing states of the photographic optical system, an image sensor for detecting the optical image, a spatial frequency component extracting circuit for extracting a plurality of spatial frequency components from image signals output from the image sensor, a calculating circuit for calculating a ratio between spatial frequency components representing different focusing states at every common frequency from the spatial frequency components extracted by the spatial frequency extracting circuit, a defocus detecting circuit for detecting a defocus amount and a focusing direction from the spatial frequency component ratios calculated by the calculating circuit and the MTF ratios stored in the storage circuit, and a driving control circuit for calculating an amount and a direction of movement of the photographic optical system from the detection result from the defocus circuit, and outputting the calculation result to the optical system driving circuit.

11 Claims, 15 Drawing Sheets

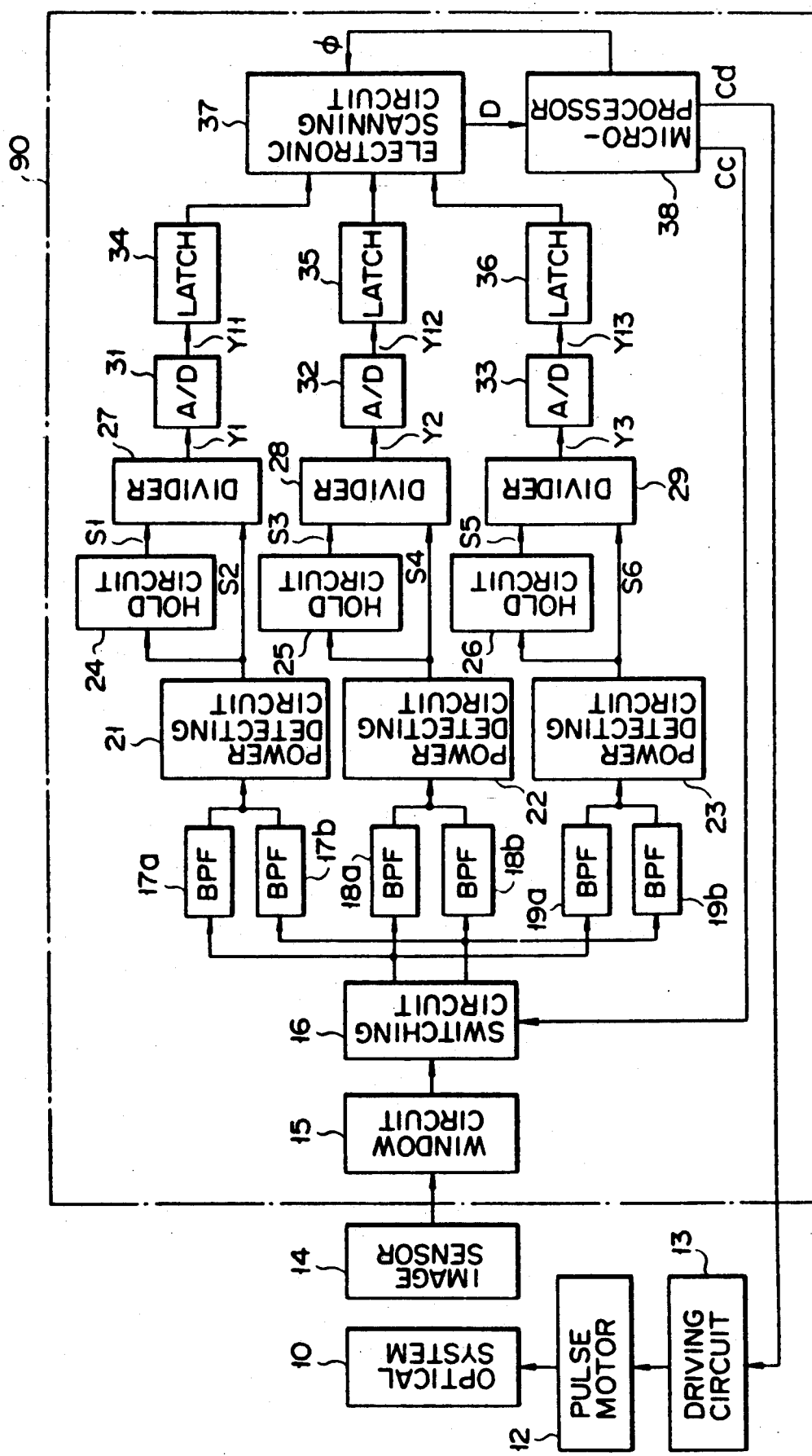
F I G. 1

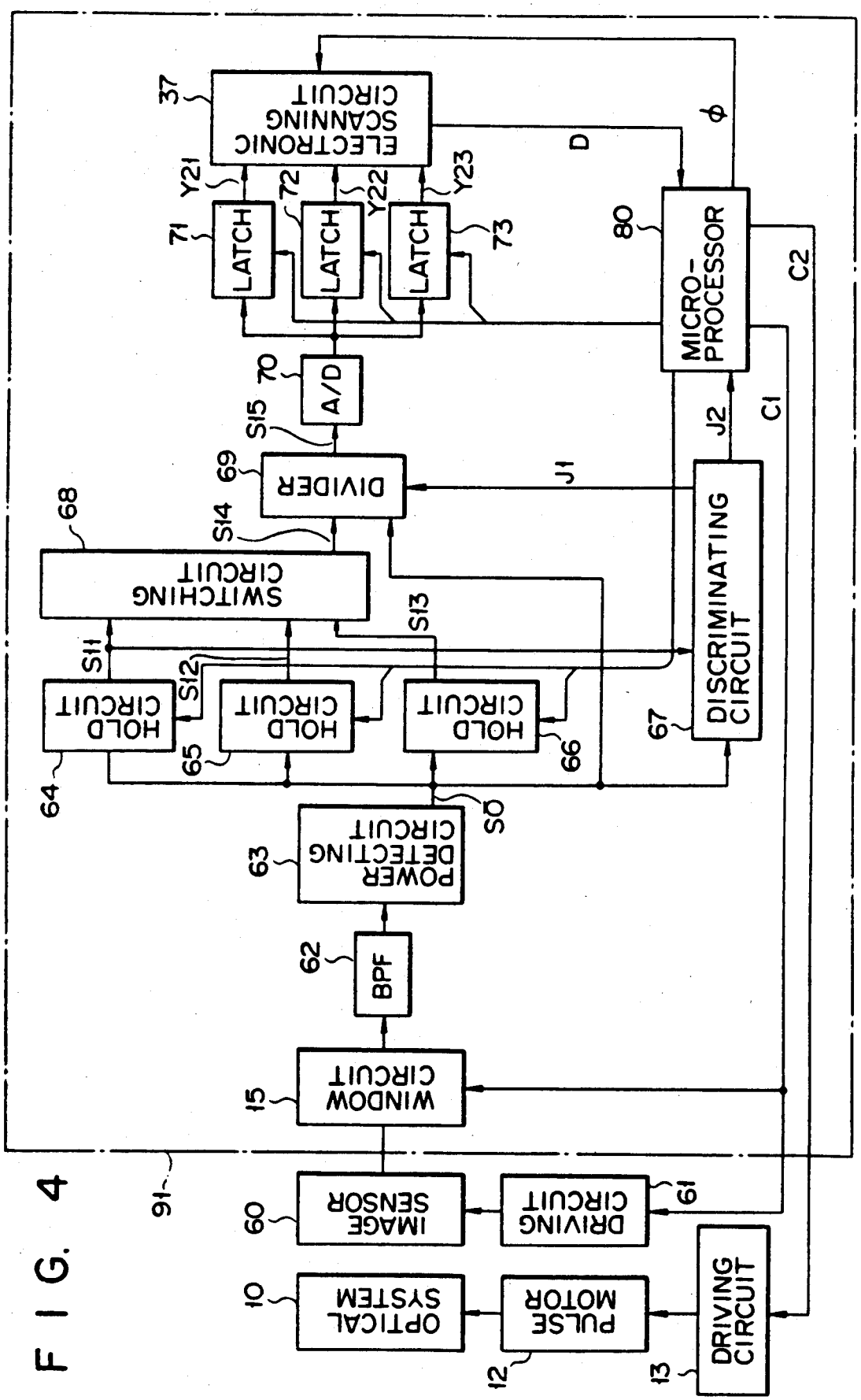
F I G. 4

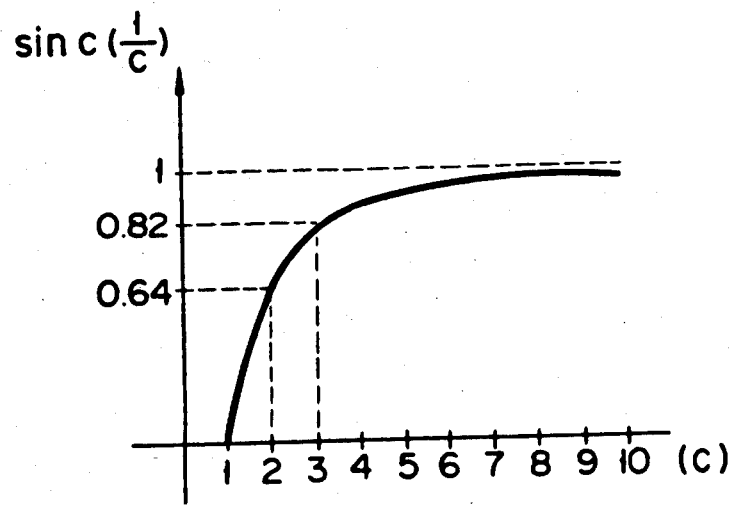
F I G. 14
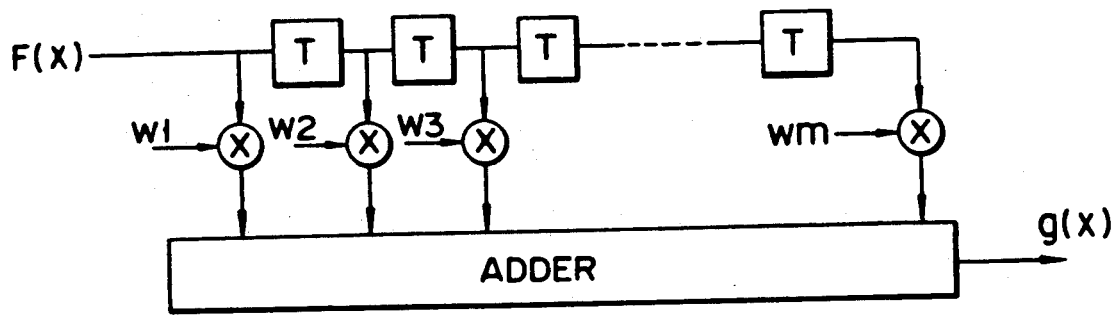
F I G. 16

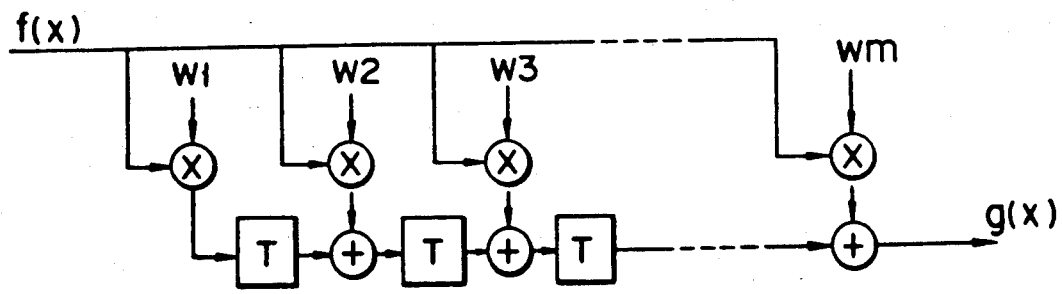
F I G. 17
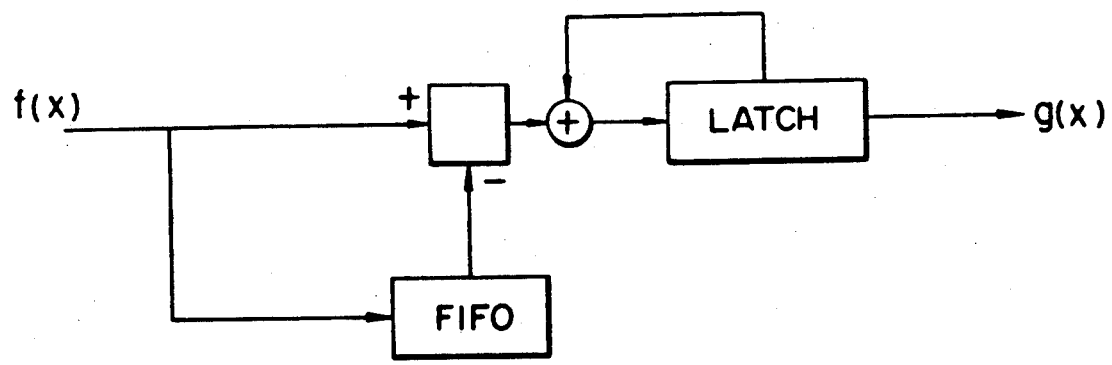
F I G. 18

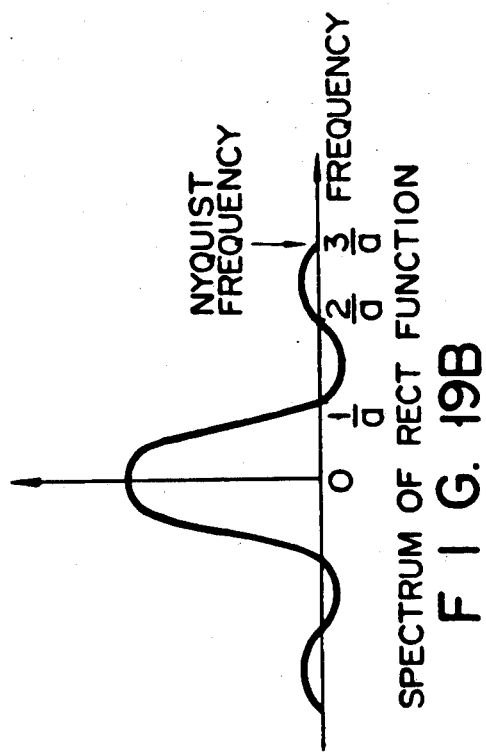
rec+(x/a)
RECT FUNCTION
F I G. 19A
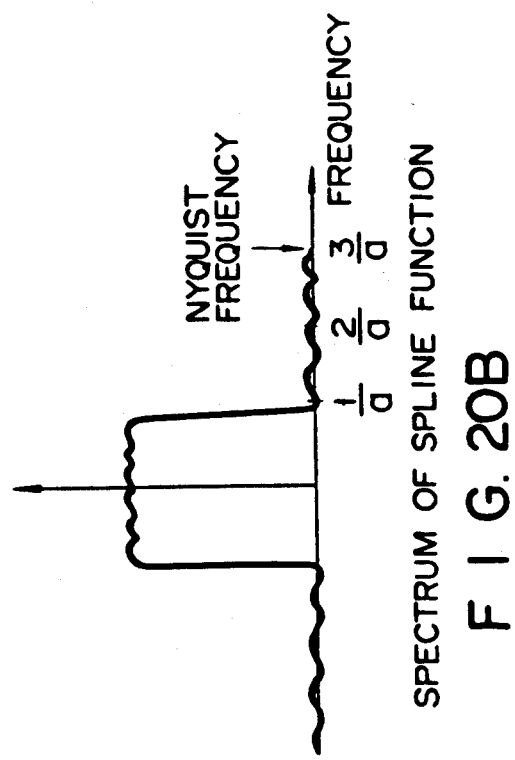
SPECTRUM OF RECT FUNCTION
F I G. 19B
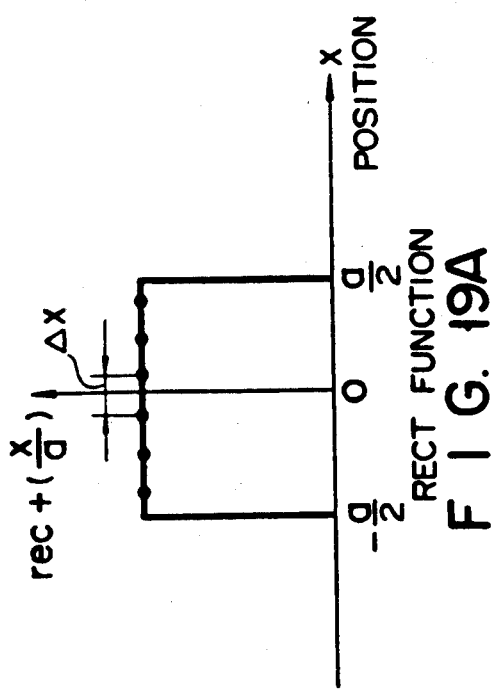
spline(x/a)
SPLINE FUNCTION
F I G. 20A
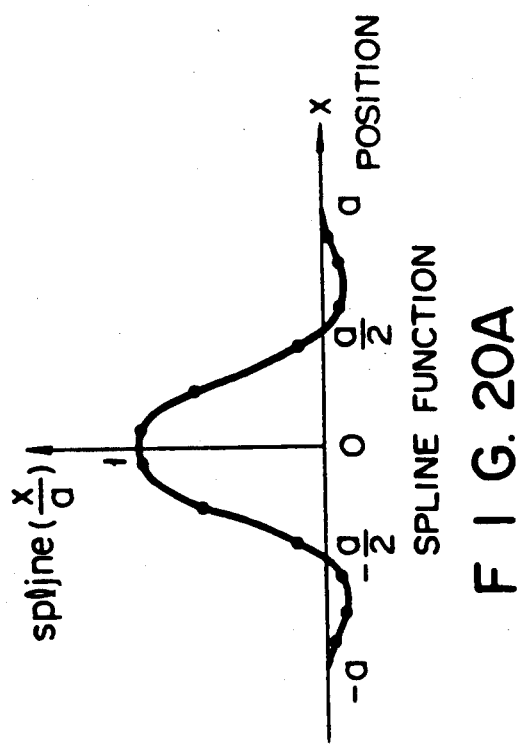
SPECTRUM OF SPLINE FUNCTION
F I G. 20B

AUTOMATIC FOCUSING APPARATUS

This is a continuation of application Ser. No. 07/458,166 filed Dec. 28, 1989, now U.S. Pat. No. 4,998,416.

BACKGROUND OF THE INVENTION

1. Field of the Invention

The present invention relates to an automatic focusing apparatus for automatically focusing an optical apparatus such as a camera.

2. Description of the Related Art

An automatic focusing apparatus of this type includes a photographic lens and a pair of lenses for re-focusing light beams which are transmitted through different portions of the photographic lens. This apparatus uses a so-called phase correlation scheme. In this scheme, focusing is performed on the basis of fact that the distance between images obtained by the pair of lenses varies depending on a defocus state. In addition, an automatic focusing apparatus using a so-called hill-climbing scheme is available. In this scheme, focusing is performed by detecting the contrast of an image formed by a photographic optical system, and moving the photographic optical system to a position where the contrast is maximum.

FIG. 24 is a view for explaining the principle of the phase correlation scheme. A optical system shown in FIG. 24 comprises: a photographic lens 1; a condenser lens 2, arranged on the focus side of the photographic lens 1, for receiving light emerging from the lens 1 as incident light; diaphragm masks 3 and 4 for respectively transmitting only the light beams emerging from the photographic lens which pass through peripheral portions A and B to be transmitted therethrough; a pair of separator lenses 5 and 6 for respectively focusing the light beams transmitted through the diaphragm masks 3 and 4; and image sensors 7 and 8 on which images are formed by the light beams focused by the separator lenses 5 and 6. Note that in FIG. 24, reference symbol O denotes an object to be photographed which is located on the optical axis of the photographic lens 1; and F, a predicted focal plane.

In the optical system having the above-described arrangement, if the object O is set at an in-focus position, the images of the object O are formed on the image sensors 7 and 8 by the separator lenses 5 and 6. In this case, a distance d between the images varies in accordance with a defocus state caused by light beams transmitted through the portions A and B of the photographic lens 1.

A defocus direction and a defocus amount can be obtained by calculating the positions of the two images on the image sensors 7 and 8 by a correlation operation, and obtaining the distance d.

FIG. 25 is a graph for explaining the principle of the hill-climbing scheme. The graph shows the contrast characteristics of an image near the predicted focal plane. As shown in FIG. 25, when the object O is set at the in-focus position, the image of the object O has the maximum contrast. If a defocus state (so-called front-focus or rear-focus state) occurs, the contrast level is lowered.

The optical lens, therefore, can be moved to the in-focus position by always moving the optical lens 1 in a direction in which the contrast level is increased.

According to another method, focus adjustment is performed by using the MTF (Modulation Transfer Function) characteristics of a photographic optical system. Published Unexamined Japanese Patent Application No. 62-284314 discloses an automatic focusing apparatus using such a method. This apparatus comprises a storage means for prestoring MTF characteristics corresponding to defocus states at predetermined spatial frequencies, a means for obtaining spatial frequency components of images at least at three positions on the optical axis of a optical lens 1, and a means for determining the actual position of the optical lens by comparing the spatial frequency components obtained by the above-described means with the prestored MTF characteristics, and detecting a defocus amount.

According to still another method, an image is formed by a photographic optical system at two positions near a predicted focal plane, and focus adjustment is performed on the basis of focal point data obtained from the respective images. Published Unexamined Japanese Patent Application No. 63-127217 discloses an automatic focusing apparatus using this method. This apparatus is designed to perform focus adjustment by calculating a defocus amount on the basis of the ratio between high-frequency components detected by a photographic optical system in two different focusing states.

In the above-described automatic focusing apparatuses, however, the following problems have been posed.

In the automatic focusing apparatus using the phase correlation scheme, if an object to be formed has a certain pattern, high correlation levels appear at a plurality of positions. Hence, an accurate position of the object cannot be obtained, and focusing adjustment cannot be performed. In addition, the apparatus requires a large number of components, such as the condenser lens 2, the diaphragm masks 3 and 4, the separator lenses 5 and 6, and the image sensors 6 and 7, as members specially used for focus adjustment. Therefore, it is difficult to reduce the apparatus in size. Besides, a high process/assembly precision is required. Furthermore, since only light beams which are transmitted through the portions A and B of the optical lens 1 are incident on the image sensors 7 and 8, the amount of incident light is relatively small. Therefore, the time required for focusing on a low-brightness object to be formed is undesirably prolonged. Moreover, the apparatus is subjected to the limitations of an optical system (an F-number, a reflecting telescope, and the like).

In the automatic focusing apparatus using the hill-climbing scheme, the optical lens is caused to pass through the focusing position once so as to detect a defocus direction and a defocus amount, and focusing adjustment is performed by moving the optical lens again. Therefore, the optical lens must be moved a plurality of times, and it takes a long period of time to focus the lens.

In the automatic focusing apparatus for performing focus adjustment using MTF characteristics as disclosed in Published Unexamined Japanese Patent Application No. 62-284314, frequency components of an image are obtained at least three positions of the optical lens. Consequently, imaging and movement of the optical system must be performed at least three times, and focusing requires a long period of time. In addition, since only spatial frequency components of a single image are used, if the image includes only a small amount of spatial frequency components, the defocus detection precision is greatly reduced.

In the automatic focusing apparatus disclosed in Published Unexamined Japanese Patent Application No. 63-127217, a defocus amount is calculated on the assumption that the MTF characteristics of the photographic optical system exhibit a Gaussian distribution. Therefore, a large error may be caused. In addition, since a defocus amount is calculated by using only spatial frequency components of a single image, if the image includes only a small amount of spatial frequency components, a larger error may be caused.

SUMMARY OF THE INVENTION

It is the first object of the present invention to provide an automatic focusing apparatus which can perform focus adjustment with high precision.

It is the second object of the present invention to provide an automatic focusing apparatus which can perform focus adjustment at high speed.

It is the third object of the present invention to provide an automatic focusing apparatus which allows a decrease in size of the apparatus.

According to the present invention, there is provided an automatic focusing apparatus comprising:

a photographic optical system, having a predetermined focal plane, for forming an optical image of an object;

an optical system driving circuit for moving the photographic optical system in a direction of an optical axis thereof;

a storage circuit for storing MTF (Modulation Transfer Function) ratios of first MTF values corresponding to a plurality of first spatial frequencies at a first position near the focal plane to second MTF values corresponding to a plurality of second spatial frequencies at a second position near the focal plane, and defocus amounts, focusing directions, and focusing states corresponding to the MTF ratios;

an image sensor for outputting image signals obtained by photoelectrically converting the optical image of the object formed by the photographic optical system while a position of the image sensor relative to the photographic optical system is changed by the driving circuit;

a spatial frequency component extracting circuit for inputting the image signals output from the image sensor to a plurality of band-pass filters having different spatial frequencies and extracting a plurality of spatial frequency components corresponding to the plurality of spatial frequencies;

a calculating circuit for extracting spatial frequency components in two different focusing states of the photographic optical system from the plurality of spatial frequency components extracted by the spatial frequency component extracting circuit, and calculating a ratio between spatial frequency components in different focusing states at every common frequency by calculations such as divisions and subtractions;

a defocus detecting circuit for comparing the spatial frequency component ratios calculated by the calculating circuit with the MTF ratios stored in the storage circuit, determining a focusing state of the photographic optical system, and detecting a defocus amount and a focusing direction in the determine focusing state; and a driving control circuit for calculating an amount and a direction of movement of the photographic optical system from the defocus amount and the focusing direction detected by the defocus detecting circuit, and outputting the calculation result to the driving circuit.

According to the present invention, the storage circuit prestores MTF ratios so as to correspond to a plurality of spatial frequencies. The MTF ratios change depending on the focusing state of the image of an object formed by the photographic optical system and depend only on the defocus amount of the photographic optical system. The optical image of the object formed by the photographic optical system is converted into an image signal by the image sensor while its focusing state is sequentially changed. The spatial frequency component extracting circuit extracts a plurality of spatial frequency components corresponding to the frequencies of the MTF ratios from the image signals output from the image sensor. These extracted spatial frequency components are held for a predetermined period of time. As a result, the relationship between the spatial frequency components which have been held for the predetermined period of time and the spatial frequency components newly output from the spatial frequency component extracting circuit becomes equivalent to the relationship between spatial frequency components in two different focusing states of the photographic optical system. The calculating circuit then calculates a ratio between spatial frequency components in two different focusing states of the photographic optical system at each common frequency. The spatial frequency component ratios calculated by the calculating circuit are compared with the MTF ratios stored in the storage circuit, and the focusing state of the photographic optical system is determined, thereby obtaining a defocus amount and a focusing direction.

BRIEF DESCRIPTION OF THE DRAWINGS

FIG. 1 is a block diagram showing an arrangement of the first embodiment of the present invention;

FIG. 4 is a block diagram showing an arrangement of the second embodiment of the present invention;

FIG. 14 is a graph showing a relationship between signal degradation and a spatial frequency;

FIG. 16 is a block diagram showing an arrangement of a filtering circuit;

FIG. 17 is a block diagram showing an arrangement of another filtering circuit;

FIG. 18 is a block diagram showing an arrangement of still another filtering circuit;

FIG. 19A is a graph showing a RECT function;

FIG. 19B is a graph showing the spectrum of the RECT function;

FIG. 20A is a graph showing a spline function;

FIG. 20B is a graph showing the spectrum of the spline function;

DETAILED DESCRIPTION OF THE PREFERRED EMBODIMENTS

Figure 2:
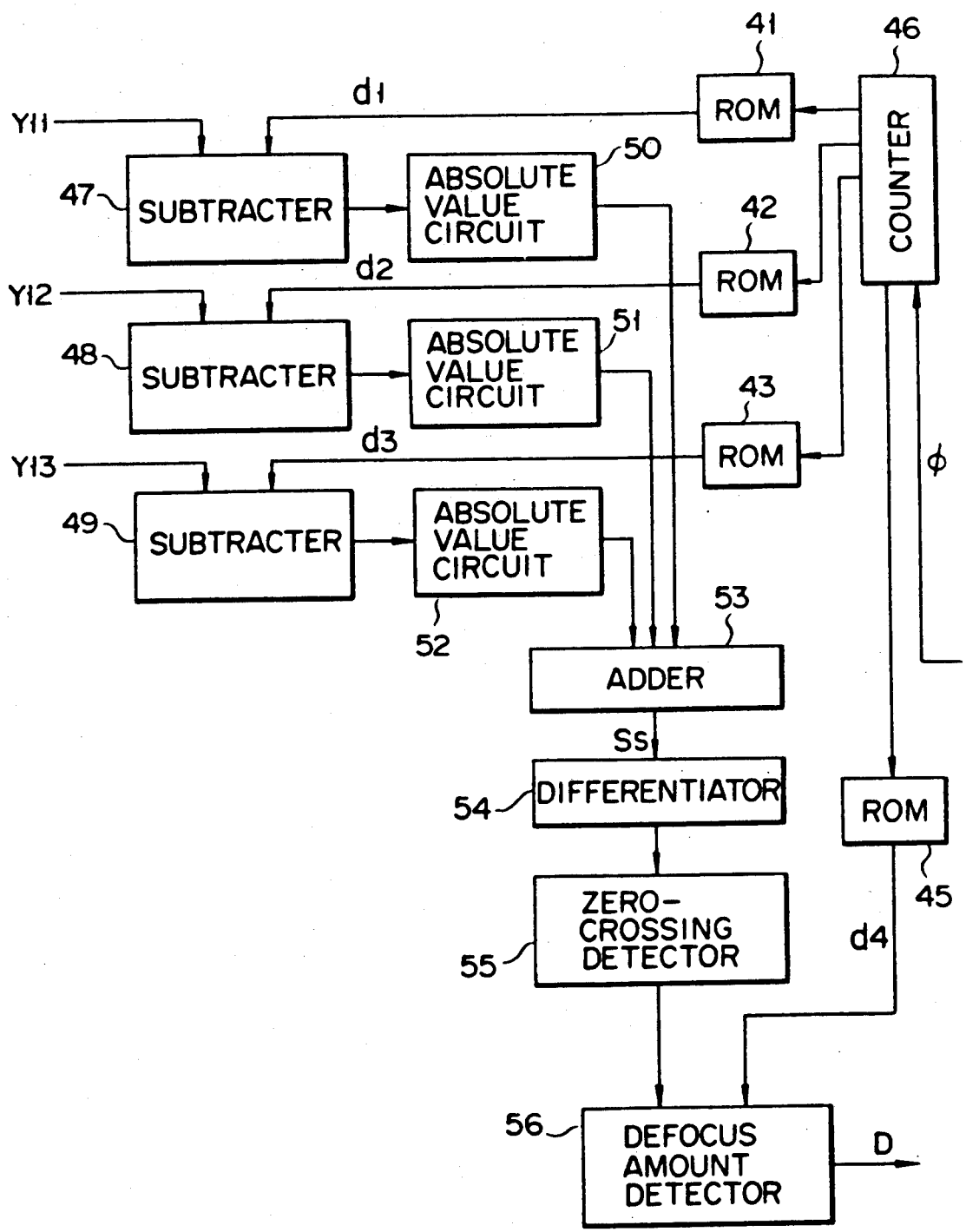
FIG. 2 is a block diagram showing an arrangement of an electronic scanning circuit.

The principle of defocus detection using the MTF characteristics of a photographic optical system will be described below.

If the MTF of the photographic optical system, the Fourier spectrum of an original image, and the Fourier spectrum of a formed image are respectively represented by $M(u,\delta)$, $F(u)$, and $G(u)$, the Fourier spectrum $G(u)$ is represented as follows:

$$G(u) = F(u) \cdot M(u, \delta) \quad (1)$$

where u is the spatial frequency, and $\delta$ is the defocus amount.

If the Fourier spectra of images formed at positions where defocus amounts $\delta_1$ and $\delta_2$ are obtained are respectively represented by $G_1(u)$ and $G_2(u)$, $$G_1(u) = F(u) \cdot M(u, \delta_1) \quad (2)$$

$$G_2(u) = F(u) \cdot M(u, \delta_2) \quad (3)$$

From equations (2) and (3), the ratio between the Fourier spectrum of the images formed at the positions where the different defocus amounts $\delta_1$ and $\delta_2$ are obtained is given as:

$$G_1(u)/G_2(u) = M(u, \delta_1)/M(u, \delta_2) \quad (4)$$
$$= r(u; \delta_1, \delta_2)$$

As shown in equation (4), the ratio $r(u;\delta_1,\delta_2)$ does not depend on the original image at all but depends on only the defocus amounts $\delta_1$ and $\delta_2$ of the photographic optical system. In this case, $r(u;\delta_1,\delta_2)$ is a function determined by a focusing state of the photographic optical system (which will be referred to as an MTF ratio function hereinafter).

Figure 6:
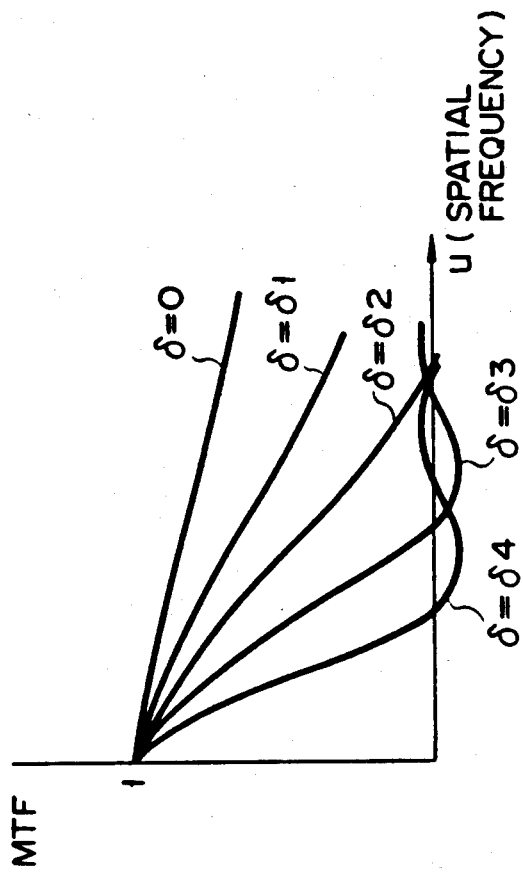
FIG. 6 is a graph showing "MTF-spatial frequency" characteristics of a photographic optical system.

The manner in which this MTF ratio function $r(u;\delta_1,\delta_2)$ changes in accordance with a focusing state of an image will be described below. FIG. 6 is a graph showing the MTF characteristics with respect to the defocus amount $\delta$. Note that the ordinate and abscissa axes respectively represent MTF values and spatial frequencies. Defocus amounts $\delta_1$ to $\delta_4$ have the following relationship: $0 < \delta_1 < \delta_2 < \delta_3 < \delta_4$. As shown in FIG. 6, the MTF values of the photographic optical system has a characteristic that a high-frequency component is reduced with an increase in defocus amount $\delta$.

Figures 7B, 7C, 7D:
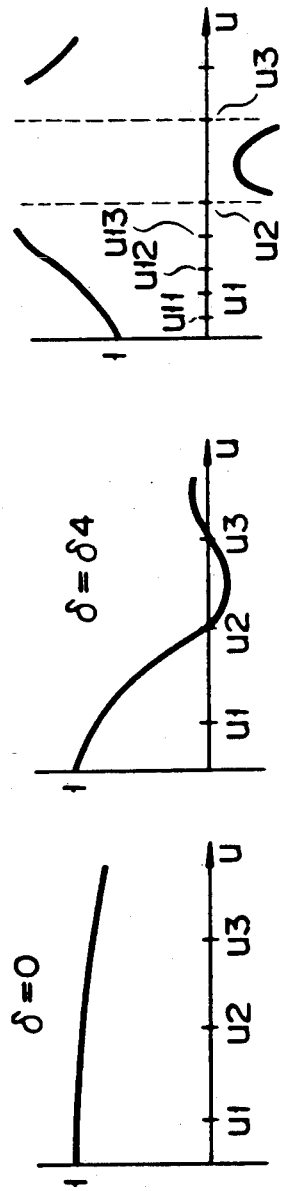
FIGS. 7A to 7D are views respectively showing the photographic optical system, MTF characteristics, and MTF ratio characteristics when the focal point of the optical system is located at one of two positions near a predicted focal plane.
Figure 7A:
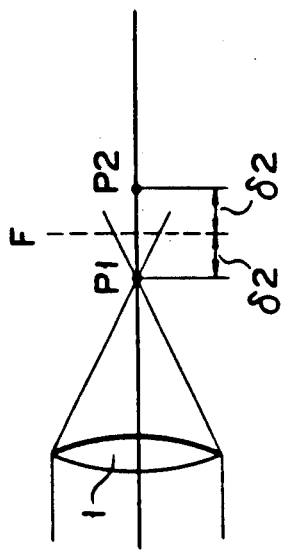
Figure 8A:
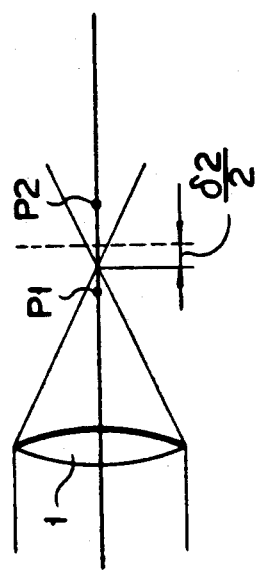
FIGS. 8A to 8D are views respectively showing the photographic optical system, MTF characteristics, and MTF ratio characteristics when the focal point of the optical system is located closer to the predicted focal plane than one of the two positions near the predicted focal plane.
Figure 8B:
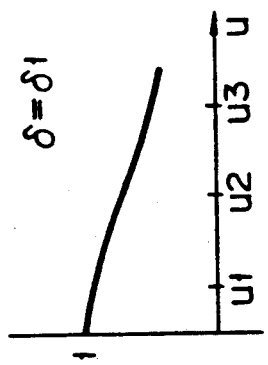
Figure 8C:
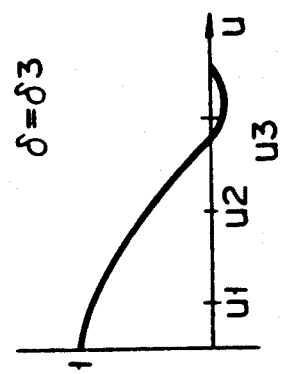
Figure 8D:
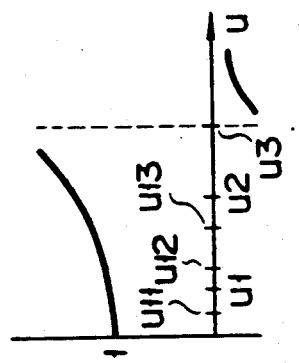
Figure 9A:
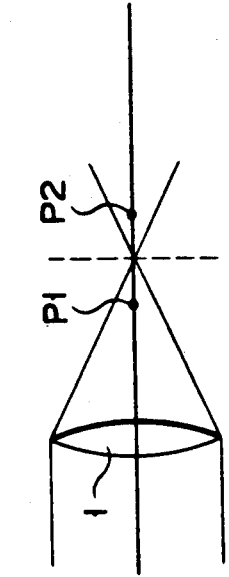
FIGS. 9A to 9D are views respectively showing the photographic optical system, MTF characteristics, and MTF ratio characteristics when the focal point of the optical system is located on the predicted focal plane.
Figure 9B:
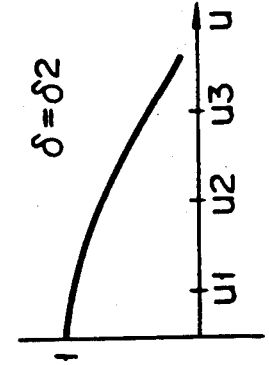
Figure 9C:
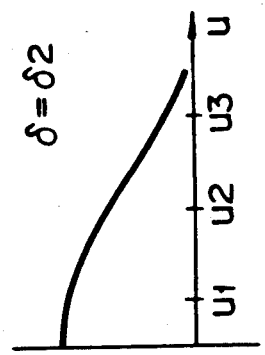
Figure 9D:
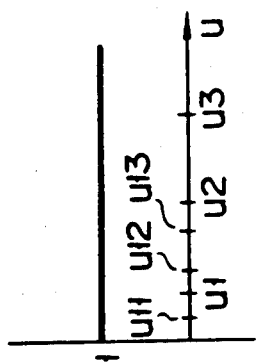
Figure 10A:
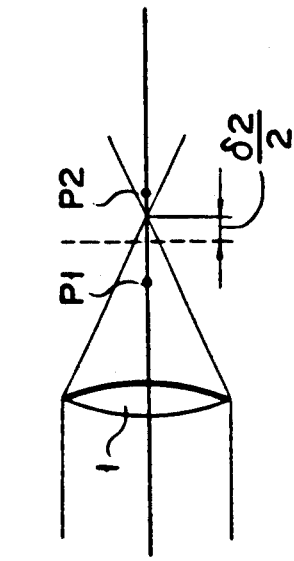
FIGS. 10A to 10D are views respectively showing the photographic optical system, MTF characteristics, and MTF ratio characteristics when the focal point of the optical system is located closer to the predicted focal plane than the other of the two positions near the predicted focal plane.
Figure 10B:
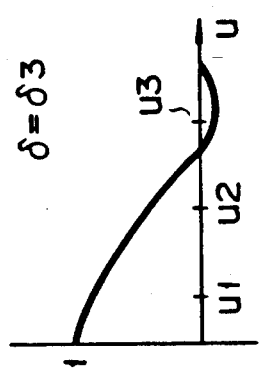
Figure 10C:
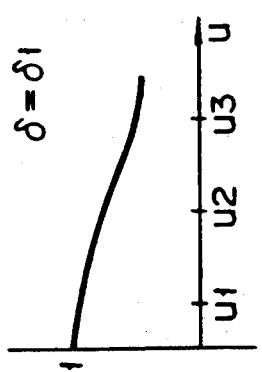
Figure 10D:
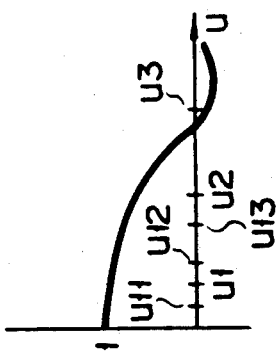

FIGS. 7A to 11D respectively show MTF characteristics at adjacent positions $P_1$ and $P_2$ on the optical axis near the predicted focal plane of the photographic optical system, and MTF ratio functions associated with the positions $P_1$ and $P_2$. Referring to FIG. 6, reference numeral 1 denotes a photographic lens. This photographic lens 1 has the MTF characteristics shown in FIG. 6. Reference symbol F denotes the predicted focal plane. The positions $P_1$ and $P_2$ are positions which are respectively shifted forward and backward from the predicted focal plane F by a $\delta_2/2$. That is, FIG. 7A shows a near-focus state corresponding to the distance $\delta_2$; FIG. 8A, a front-focus state corresponding to a distance $\delta_2/2$; FIG. 9A, an in-focus state; FIG. 10A, a rear-focus state corresponding to the distance $\delta_2/2$; and FIG. 11A, a rear-focus state corresponding to the distance $\delta_2$. Each of FIGS. 7B, 8B, 9B, 10B, and 11B shows MTF;$MZ_1(u)$ as an MTF curve at the position $P_1$. Each of FIGS. 7C, 8C, 9C, 10C, and 11C shows MTF;$M_2(u)$ as an MTF curve at the position $P_2$. Note that these drawings show defocus amounts respectively corresponding to the MTF curves. In addition, each of FIGS. 7D, 8D, 9D, 10D, and 11D shows an MTF ratio function $r(u;\delta_1,\delta_2)$ represented by $M_1(u)/M_2(u)$ and associated with the positions $P_1$ and $P_2$. As shown in FIGS. 7A to 11D, the shape of the MTF ratio function $r(u;\delta_1,\delta_2)$ curve shown in each of FIGS. 7D, 8D, 9D, 10D, and 11D is determined by the focusing state shown in each of FIGS. 7A, 8A, 9A, 10A, and 11A. That is, if an MTF ratio function is obtained, the focusing state of an image can be determined. Hence, a defocus amount and a defocus direction can be obtained.

When focus adjustment is to be performed by using the above-described principle of defocus detection, it is difficult to obtain MTF ratio functions $r(u;\delta_1,\delta_2)$ in the entire frequency band. For this reason, a storage means is arranged in the apparatus so as to store MTF ratio function values with respect to a plurality of typical spatial frequencies (e.g., spatial frequencies u1, u2, and u3 shown in FIGS. 7A to 11D) representing MTF ratio function characteristics well. With this arrangement, MTF ratio function values in a wide frequency band can be easily stored in the storage means.

In the focusing state shown in FIG. 7A, the MTF ratio function curve has a shape shown in FIG. 7D, in which the MTF ratio function becomes infinite at the spatial frequencies u2 and u3, and the curve becomes discontinuous. This is because the defocus amount at the position $P_2$ (corresponding to the denominator of a ratio) is large, and the denominator of the MTF ratio becomes zero. If a discontinuous portion is present in an MTF ratio function, a large calculation error is caused.

In order to eliminate such inconvenience, the detecting spatial frequencies are switched to different values. If, for example, in the case of the MTF ratio function shown in FIG. 7D, the spatial frequencies u1, u2, and u3 are switched to frequencies u11, u12, and u13, a comparison between MTF values at the discontinuous portion can be avoided. With such spatial frequencies, however, a change in MTF ratio is small, and hence sufficient precision cannot be obtained. Therefore, spatial frequencies to be used must be properly switched.

Figure 11A:
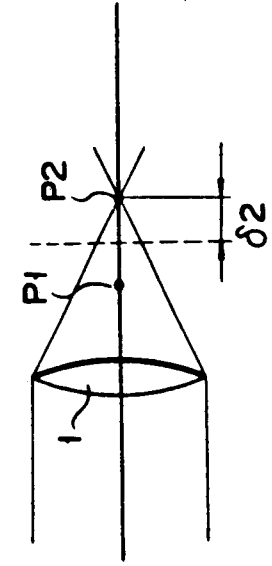
FIGS. 11A to 11D are views respectively showing the photographic optical system, MTF characteristics, and MTF ratio characteristics when the focal point of the optical system is located at the other of the two positions near the predicted focal plane.
Figure 11B:
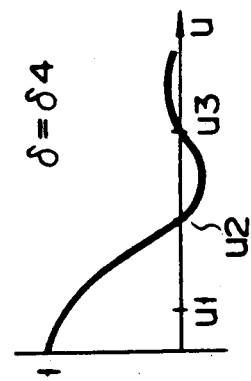
Figure 11C:
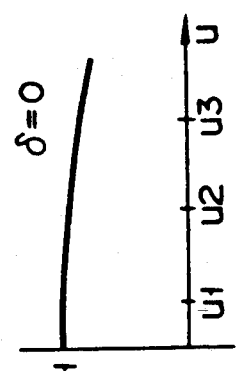
Figure 11D:
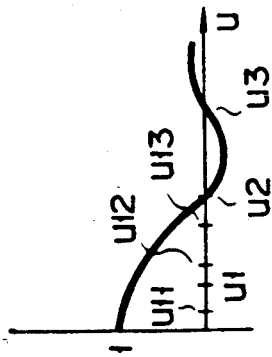

Furthermore, in order to prevent the above-described inconvenience, the ratio of spatial frequency components of images may be calculated by using the spatial frequency component of one of the images which has a smaller defocus amount as a denominator. For example, in the case of the focusing state shown in FIG. 7A, if an MTF ratio function is obtained by $$r(u;\delta_1,\delta_2) = M_2(u)/M_1(u)$$

the obtained MTF ratio function curve has the same shape as that shown in FIG. 11D, and no discontinuous portion is produced. However, a discriminating means is required to discriminate the focusing state shown in FIG. 7A from that shown in FIG. 11A. As such a discriminating means, for example, a means for determining the focusing state shown in FIG. 7A if $M_1(u1) > M_2(u2)$, and determining the focusing state shown in FIG. 11A if $M_1(u1) > M_2(u2)$ may be considered.

If an image sensor of a two-dimensional interlined transfer scheme is used, the following focus adjustment can be performed. A case will be described below, wherein the above-mentioned image sensor is applied to, e.g., an electronic camera.

Figure 12:
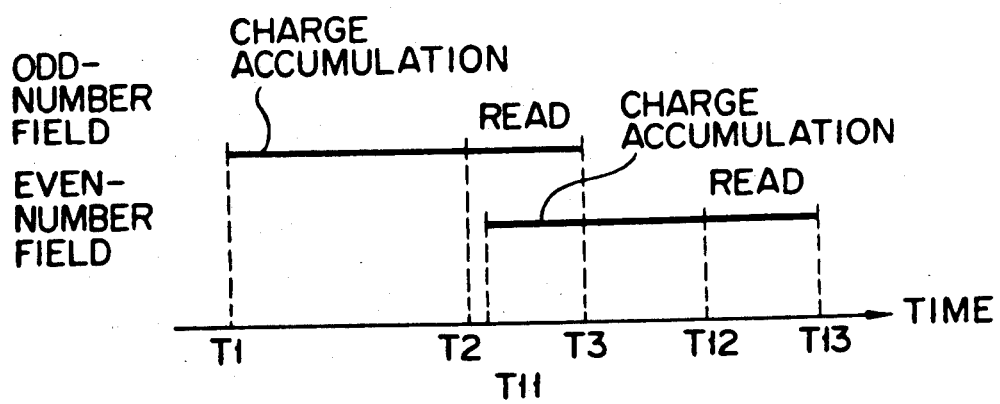
FIG. 12 is a timing chart showing read and charge accumulation timings of an image sensor.
Figure 13:
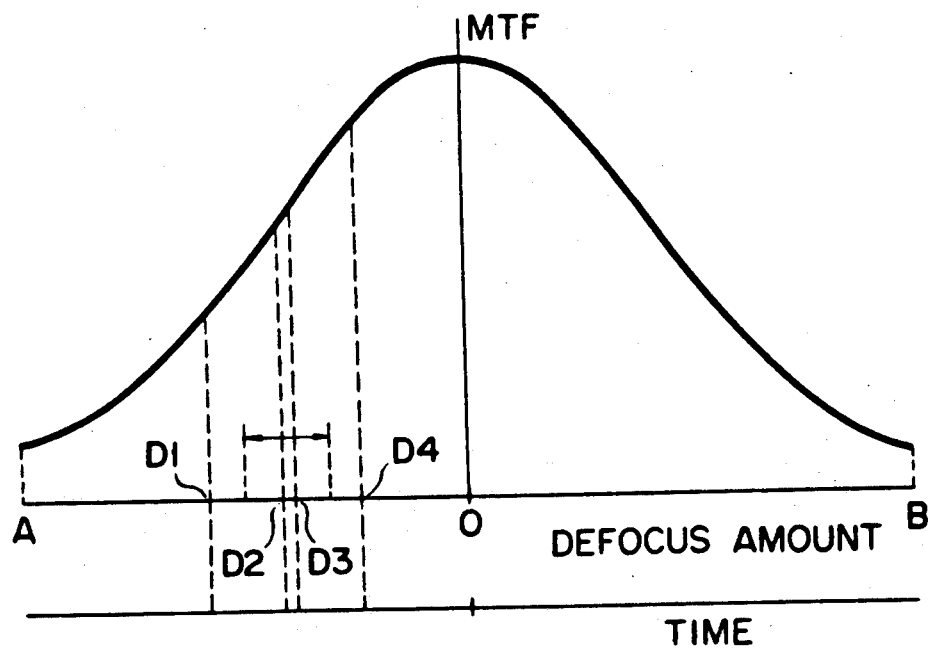
FIG. 13 is a graph showing a relationship between an MTF and a defocus amount.

While an optical lens is moved in the direction of the optical axis at the same speed V, an image corresponding to one frame is picked up by a two-dimensional interlined transfer scheme CCD as an image sensor. FIG. 12 shows a charge accumulation/read timing of each field in this pick up operation. Referring to FIG. 12, reference symbols T1, T2, and T3 respectively denote a charge accumulation start time, a charge accumulation end time, a read start time, and a read end time in each field; and T11, T12, and T13, a charge accumulation start time, a charge accumulation end time, a read start time, and a read end time. FIG. 13 shows a curve of "defocus amount-MTF" characteristic corresponding to each time.

Assume that movement of the optical lens and pick up by means of the CCD are started (time T1) at the point of a defocus amount D1, and the optical lens is moved such that defocus amounts D2, D3, and D4 are respectively obtained at time T2, time T11, and time T12. In this case, an average difference Ld in optical path length between odd-numbered and even-numbered fields can be represented by the following equation:

$$Ld = \{(T2 - T1)/2 + (T12 - T11)/2 + (T11 - T2)\} \times V \quad (5)$$
$$= (T12 + T11 - T2 - T1) \times V/2$$

That is, an image of a focusing state having the optical path length difference Ld can be formed upon equispeed movement of the optical lens, and this difference Ld can be adjusted by controlling the speed of movement. In addition, by exchanging optical lenses, the apparatus can respond to a change in optimal optical path length difference. Note that odd-numbered and even-numbered field signals of image signals output from the image sensor are used because both the fields have a high correlation level, and the time for pick up and focusing can be shortened.

Since images are formed in two different focusing states in this manner, focus adjustment can be performed without using any member specially designed for focus adjustment. Hence, the apparatus can be reduced in size and is free from the limitations of an optical system. In addition, since all of light beams which are incident on the photographic optical system can be used, the charge accumulation time can be shortened even for a low-brightness object to be formed. A high-brightness object can be easily processed by changing charge accumulation start times T1 and time T11. Therefore, focusing adjustment can be performed without being influenced by the brightness of an object to be formed.

Degradation in image signal due to the movement of the optical lens will be described below. A case will be considered, wherein the optical lens is moved from a point A to a point B shown in FIG. 13. Assume that the distance between the points A and B is given as l, and the MTF curve has a shape corresponding to a one-period portion of a sine wave. If the difference $Ld = l/c$ (c is the denominator of the distance between the points A and B), a degradation function due to movement can be given as sinc(lu/c), where u is the spatial frequency. Note that the spatial frequency $u = 1/l$ of a sine wave is sinc(1/c). FIG. 14 shows a curve based on this function. As shown in FIG. 14, degradation in image signal can be minimized by adjusting the difference Ld, i.e., the speed of movement of the optical lens so as to set $c = 3$ to 5 or more.

An automatic focusing apparatus to which the above-described principle of defocus detection is applied will be described in detail below.

FIG. 1 is a block diagram showing an arrangement of an automatic focusing apparatus according to the first embodiment of the present invention. Referring to FIG. 1, reference numeral 10 denotes a photographic optical system having the MTF characteristics shown in FIGS. 7A to 11D; 12, a pulse motor for driving the photographic optical system 10; 13, a driving circuit for the pulse motor 12; and 14, an image sensor arranged near the predicted focal plane of the photographic optical system 10 and constituted by an interlined transfer scheme CCD. The output terminal of the image sensor 14 is connected to a window circuit 15. The window circuit 15 serves to extract, from an image signal from the image sensor 14, an image signal corresponding to an area on which the optical system 10 is to be focused. The window circuit 15 is connected to a switching circuit 16. The output terminals of the switching circuit 16 are connected in parallel with a plurality of band-pass filters (to be referred as BPFs hereinafter) 17a to 19a and 17b to 19b. The switching circuit 16 switches image signals input, which are input from the window circuit 15 to the respective BPFs, to the BPFs 17a to 19a or 17b to 19b. Note the BPFs 17a to 19a and 17b to 19b respectively have passing center frequencies of u1 to u3 and u11 to u13, which respectively correspond to the spatial frequencies u1 to u3 and u11 to u13 shown in FIGS. 7A to 11D. The BPFs 17a and 17b are connected to a power detecting circuit 21. The BPFs 18a and 18b are connected to a power detecting circuit 22. The BPFs 19a and 19b are connected to a power detecting circuit 23. The power detecting circuits 21 to 23 are respectively connected to corresponding hold circuits 24 to 26 and dividers 27 to 29. The power detecting circuits 21 to 23 respectively detect spatial frequency components of image signals which pass through the BPFs 17a to 19a and 17b to 19b, and output spatial frequency components S2, S4, and S6 as output signals to the corresponding hold circuits 24 to 26 and the dividers 27 to 29. The dividers 27 to 29 respectively calculate spatial frequency component ratios Y1 (=S1/S2), Y2 (=S3/S4), and Y3 (=Y5/Y6). The power detecting circuits 21 to 23, the hold circuits 24 to 26, and the dividers 27 to 29 constitute calculating means for obtaining spatial frequency component ratios. The dividers 27 to 29 are respectively connected to A/D converters 31 to 33. The A/D converters 31 to 33 respectively output analog signals Y1, Y2, and Y3 output from the dividers 27 to 29 as digital signals Y11, Y12, and Y13. The digital signals Y11 to Y13 output from the A/D converters 31 to 33 are respectively input to latche circuits 34 to 36, and are then input to an electronic scanning circuit 37. The electronic scanning circuit 37 detects an MTF ratio pattern from clock pulses $\phi$ supplied from a microprocessor 38 and the signals Y11 to Y13 representing spatial frequency component ratios which are supplied from the latches 34 to 36 at a predetermined timing, and outputs a defocus signal D to the microprocessor 38. In response to the defocus signal D, the microprocessor 38 outputs a driving control signal Cd of the photographic optical system 10 to the driving circuit 13. In addition, the microprocessor 38 outputs a switching signal Cc to the switching circuit 16 so as to switch the output to the BPFs 17a to 19a or 17b to 19b.

FIG. 2 shows a circuit arrangement of the electronic scanning circuit 37. Referring to FIG. 2, reference numerals 41 to 43, and 45 denote ROMs (read-only memories). The ROMs 41 to 43 respectively store MTF ratios d1, d2, and d3 with respect to N types of focusing states at spatial frequencies (u1 and u11), spatial frequencies (u2 and u12), and spatial frequencies (u3 and u13). The ROM 45 stores defocus amounts d4 with respect to the N types of focusing states. In this case, if each of the digital data Y11, Y12, and Y13 representing frequency ratios consists of 8 bits, the number of types of focusing states, i.e., N=256, and 256×2=512 data are stored in the ROMs 41 to 45. Reference numeral 46 denotes a counter for causing the ROMs 41 to 43 to output the ratios d1, d2, and d3 to subtracters 47 to 49 in response to a timing pulse signal $\phi$ from the microprocessor 38. The subtracters 47 to 49 perform subtraction processing of the MTF ratios d1, d2, and d3 supplied from the ROMs 41 to 43 and the digital data Y11, Y12, and Y13 which are supplied from the latches 34 to 36 and represent the spatial frequency component ratios. The subtraction results respectively obtained by the subtracters 47 to 49 are input to an adder 53 through absolute value circuits 50 to 52. As a result, the adder 53 outputs a scan signal Ss. This scan signal Ss is input to a zero-crossing detector 55 through a differentiator 54. An output signal from the zero-crossing detector 55 and an output signal d4 from the ROM 45 are input to a defocus amount detector 56. The defocus amount detector 56 detects an MTF ratio pattern from the output signal from the zero-crossing detector 55 and the defocus amounts of the N focusing states read out from the ROM 45 when detected the zero-crossing position and outputs a defocus signal D.

A function of the automatic focusing apparatus having the above-described arrangement will be described below.

Figure 3:
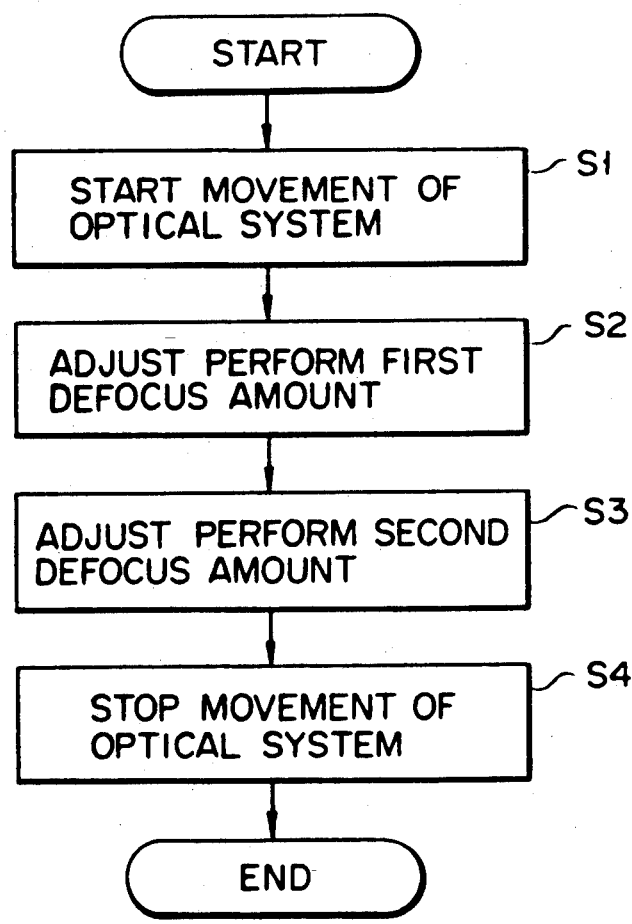
FIG. 3 is a flow chart showing a focus adjustment sequence.

FIG. 3 is a flow chart showing a schematic focus adjustment sequence. When focus adjustment is started, movement of the photographic optical system 10 is started (step S1), and first defocus adjustment is performed (step S2). In step S2, a combination of the BPFs 17b to 19b on the low-frequency side is used. Second defocus adjustment is performed by using the BPFs 17a to 19a on the high-frequency side (step S3). The movement of the photographic optical system 10 is then stopped at an in-focus position (step S4), thus completing focus adjustment.

The function of the embodiment will be described in detail below. When focus adjustment is started, movement of the photographic optical system 10 at the same speed V is started. The photographic optical system 10 may be moved in either one of the directions in which the optical system 10 approaches or moves away from the image sensor 14. First defocus adjustment is started at the same time as the movement of the photographic optical system 10 is started, and hence an imaging operation of the image sensor 14 is started. The optical image of an object to be formed by the image sensor 14 is converted into image signals, which are sequentially read in units of fields from odd-numbered fields to even-numbered fields. FIGS. 12 and 13 respectively show accumulation and read timings of the image signals of the image sensor 14, and defocus amounts at the respective times. Note that in this case, time T1 and time T11 are controlled by an additionally arranged exposure detecting element so as to set a proper exposure value. From the read image signals, only signals corresponding to an area on which the optical system 10 is to be focused are extracted by the window circuit 15, and are input to the switching circuit 16.

In the process of first defocus amount adjustment, the microprocessor 38 outputs the switching signal Cc, which is used to switch the output to the low-frequency side BPFs 17b to 19b, to the switching circuit 16. As a result, the image signals from the switching circuit 16 are supplied to the low-frequency side BPFs 17b to 19b. The component amounts of spatial frequencies u11, u12, and u13 are respectively obtained by the power detecting circuits 21 to 23 from the image signals supplied to the BPFs 17b to 19b. These component amounts are the component amounts of odd-numbered field signals. After a time corresponding to one field elapses, signals S1, S3, and S5 are output as spatial frequency components of odd-numbered fields from the hold circuits 24 to 26, and signals S2, S4, and S6 are output as spatial frequency components of even-numbered fields. Therefore, the dividers 27 to 29 respectively receive spatial frequency components (S1, S2), (S3, S4), and (S5, S6) each pair having the same frequency and different focusing states (obtained by performing imaging operations at odd-numbered and even-numbered fields). As a result, the dividers 27 to 29 respectively perform dividing operations of the component ratios of the spatial frequencies at the different focusing states at each of the frequencies U11, U12, and U13. The dividers 27 to 29 respectively output spatial frequency component ratios Y1 (=S1/S2), Y2 (=S3/S4), and Y3 (=S5/S6). The spatial frequency component ratios Y1 to Y3 output from the dividers 27 to 29 are converted into digital signals Y11, Y12, and Y13 by the A/D converters 31 to 33. The digital signals Y11, Y12, and Y13 are then input to the electronic scanning circuit 37 while they are held in the latches 34 to 36 for a predetermined period of time.

In the electronic scanning circuit 37, clock pulses $\phi$ from the microprocessor 38 are sequentially input to the counter 46. The counter 46 outputs read signals having read addresses which sequentially change to the ROMs 41 to 43 and 45 in response to the input clock pulses $\phi$. As a result, MTF ratios d1 to d3 which are stored to correspond to a plurality of focusing states with respect to a plurality of spatial frequencies are sequentially read out from the ROMs 41 to 43, and are input to the subtracters 47 to 49. A defocus amount d4 corresponding to the MTF ratios read out from the ROM 41 to 43 is read out from the ROM 45 and is input to the defocus amount detector 56. That is, the read addresses of the ROMs 41 to 43 and 45 are scanned on the basis of the clock pulses $\phi$. The subtracters 47 to 49 respectively perform comparison and subtraction of the spatial frequency component ratios Y11 to Y13 and the preset MTF ratios d1 to d3. The absolute values of the subtraction results are obtained by the absolute value circuits 50 to 52, and are added together by the adder 53. A scan signal Ss is then output from the adder 53. The value of the scan signal Ss is given as:

$$Ss = |Y11 - d1| + |Y12 - d2| + |Y13 - d3| \quad (6)$$

This scan signal Ss has the minimum value at the in-focus position. Therefore, a zero-crossing position is detected by differentiating the scan signal Ss by means of the differentiator 54, and detecting a zero-crossing of the differentiation result by means of the zero-crossing detector 55. When the zero-crossing position is detected by the zero-crossing detector 55, the defocus amount detector 56 outputs the defocus amount d4 read out from the ROM 45, as a defocus signal D, to the microprocessor 38. The microprocessor 38 calculates a target stop position of the photographic optical system 10 from the input defocus signal D and the current moving speed V of the optical system 10, and outputs a control signal Cd for focus adjustment to the driving circuit 13. A driving operation of the pulse motor 12 is controlled by the control signal Cd so as to adjust the movement of the photographic optical system 10.

Note that if the photographic optical system 10 is to be moved in the opposite direction, it is controlled to move in the opposite direction to that described above. If it is determined that the target stop position is located far from the current position of the photographic optical system 10, the optical system 10 is moved at a speed higher than the moving speed V. With this operation, the first defocus amount adjustment is completed. When the photographic optical system approaches the target position, the moving speed is set to the speed V again, and the second defocus amount adjustment is performed in the same manner as in the first adjustment. That is, imaging operations are performed in units of fields by the image sensor 14, and an operation similar to that described above is performed on the basis of the obtained image signals, thereby obtaining a defocus amount. In the second adjustment, however, the high-frequency side BPFs 17a to 19a are used, and the defocus amount is calculated by using data in the ROMs 41 to 43, and 45 which have values corresponding to spatial frequencies u1, u2, and u3. As a result, a target stop position of the photographic optical system 10 is obtained again, and the movement of the photographic optical system 10 is adjusted When the optical system 10 reaches the target position, its movement is stopped, thus completing the focus adjusting operation.

As described above, according to the first embodiment, MTF ratios corresponding to a plurality of frequencies are stored in the ROMs 41 to 43 and 45 so as to correspond to a plurality of focusing states of the photographic optical system 10. Spatial frequency component ratios in two different focusing states are obtained with respect to a plurality of frequency components, and are compared with the preset MTF ratios so as to obtain the defocus amount and focus direction of the photographic optical system. Therefore, a defocus amount and a focus direction can be detected by one focus adjusting operation without being influenced by a state of an object to be pick up.

Since focus adjustment is performed using only an image signal from the image sensor 14, any member specially designed for focus adjustment, such as a sensor is not required. Therefore, the apparatus can be reduced in size, and is free from the limitations of an optical system.

Since odd-numbered and even-numbered field signals from the image sensor 14 are used, images can be formed in two focusing states in a short period of time. In addition, since comparison between MTF ratios and spatial frequency component ratios Y11 to Y13 is performed by electronic scanning, a high-speed operation can be realized. Therefore, the time for focus adjustment can be shortened.

Since the BPFs 17a to 19a and BPFs 17b to 19b constitute a two-step arrangement of the high-frequency and low-frequency sides, and these sides are switched by the switching circuit 16, high-precision focus adjustment can be performed even if the defocus amount is large.

In the first embodiment, defocus amount adjustment is performed twice. However, defocus amount adjustment may be continuously repeated, or focus adjustment can be performed by only one defocus adjustment. In addition, the ROMs 41 to 43 and 45 may be arranged in the photographic optical system 10. With this arrangement exchange of photographic optical systems is facilitated. A plurality of image sensors 14 may be arranged near the predicted focal plane so as to obtain two different focusing states. Furthermore, if a proper imaging element is used, the accumulation times of the odd-numbered and even-numbered fields shown in FIG. 12 may be allowed to overlap each other. With this arrangement, the focusing time can be further shortened. In the embodiment, the window circuit 15 is used to extract only signal components corresponding to an area on which the photographic optical system is to be focused. In this case, however, if the signals of the respective lines are added together, the noise can be reduced. Noise reduction can be performed by extracting signal components at a plurality of positions. In the embodiment, the differentiator 54 and the zero-crossing detector 55 are used to detect the minimum value from the scan signal Ss. However, a minimum value detector may be simply used.

FIG. 4 is a block diagram showing an arrangement of an automatic focusing apparatus according to the second embodiment of the present invention. The same reference numerals in FIG. 4 denote the same parts as in FIG. 1, and a detailed description thereof will be omitted. In this embodiment, a nondestructive read access image sensor is used as an image sensor, and the ratio between spatial frequency components is calculated by using one of the spatial frequency components which has a smaller defocus amount as a denominator. Referring to FIG. 4, reference numeral 60 denotes a nondestructive read access image sensor arranged near the predicted focal plane of a photographic optical system 10. The image sensor 60 is constituted by, e.g., an SIT, AMI, or CMD. The image sensor 60 is moved in the direction of the optical axis by a driving circuit 61 which is opposed to the image sensor 60. Reference numeral 62 denotes a BPF having one passing center spatial frequency. The BPF 62 is connected to a power detecting circuit 63. Hold circuits 64 to 66 and a discriminating circuit 67 are connected in parallel with the power detecting circuit 63. The hold circuits 64 to 66 are connected to a switching circuit 68. The output terminal of the hold circuit 64 is also connected to the discriminating circuit 67. The switching circuit 68 is connected to a divider 69, and is designed to switch outputs S11 to S13 of the hold circuits 64 to 66 so as to supply them to the divider 69. The divider 69 is directly connected to the output terminal of the power detecting circuit 63. The divider 69 performs division of a spatial frequency component $\overline{So}$ from the power detecting circuit 63 and each of spatial frequencies S11 to S13 from a corresponding one of the hold circuits 64 to 66, and outputs the division result. Switching control is performed by the switching circuit 68 in such a manner that the signals S11 to S13 output from the hold circuits 64 to 66 and input to the divider 69 coincides in frequency with the spatial frequency component $\overline{So}$ from the power detecting circuit 63. The discriminating circuit 67 discriminates the magnitude of the output signal $\overline{So}$ from the power detecting circuit 63 and that of the output signal S11 from the hold circuit 64, and outputs discrimination signals J1 and J2 to the divider 69 and a microprocessor 80, respectively. A spatial frequency component ratio S15 output from the divider 69 is input to an A/D converter 70. A plurality of latches 71 to 73 are connected in parallel with the A/D converter 70 at the respective frequencies. The latches 71 to 73 are connected to the electronic scanning circuit 37. The microprocessor 80 is connected to the hold circuits 64 to 66, and outputs command signals to the hold circuits 64 to 66 so as to set their respective hold intervals. In addition, the microprocessor 80 is connected to the latches 71 to 73 so as to output latch timing signals to them. Furthermore, the microprocessor 80 outputs a clock pulse signal $\phi$ to the electronic scanning circuit 37 so as to read out MTF ratios. The microprocessor 80 outputs a control signal C1 for driving the image sensor and a control signal C2 for driving the photographic optical system 10 on the basis of a defocus signal D from the electronic scanning circuit 37 and the discrimination signal J2 from the discriminating circuit 67.

A function of the automatic focusing apparatus having the above-described arrangement will be described below. When focus adjustment is started, the photographic optical system 10 is moved at a constant speed V. An imaging operation of the image sensor 60 is started, and a read operation of image signals is performed. In this case, the imaging operation is performed such that an optimal exposure value is obtained by an exposure detecting element (not shown). This read operation is performed three times, and read clock frequencies $\phi_1$, $\phi_2$, and $\phi_3$, ($\phi_1 < \phi_2 < \phi_3$) for the image sensor 60 are changed, thereby performing time-base modulation of signals. That is, different spatial frequency components can be extracted by the single BPF 62 by using the nondestructive read access image sensor 60 and changing the read clock frequencies at the same time In this manner, the output signal $\overline{So}$ from the power detecting circuit 63 has a component amount of a spatial frequency u1 when the read clock $\phi_1$ is output; a component amount of a spatial frequency u2 when the read clock $\phi_2$ is output; and a component amount of a spatial frequency u3 when the clock $\phi_3$ is output. The timings of the hold circuits 64 to 66 are controlled in accordance with a change in read clock frequency such that the output signal S11 from the hold circuit 64 has the component amount of the spatial frequency u1, the output signal S12 from the hold circuit 65 has the component amount of the spatial frequency u2, and the output signal from the hold circuit 66 has the component amount of the spatial frequency u3. In this case, even while the photographic optical system 10 is driven, the same image is repeatedly read by using the characteristics of the image sensor 60 as a nondestructive read access imaging element so that the signals S11, S12, and S13 respectively represent the spatial frequency component amounts of the same image. Note that a slight change in image may be caused due to charge accumulation during the three read operations. However, such inconvenience can be eliminated by shortening the read time or using a mechanical shutter.

Subsequently, an imaging operation is performed, the read clock frequencies are changed to $\phi_1$, $\phi_2$, and $\phi_3$, and a read operation is performed three times again. The switching circuit 68 performs a switching operation so as to set S14=S11 when the output signal $\overline{So}$ from the power detecting circuit 63 has the component amount of u1, to set S14=S12 when the output signal $\overline{So}$ has the component amount of u2, and to set S14=S13 when the output signal $\overline{So}$ has the component amount of u3. In the divider 69, the spatial frequency component ratio S15, i.e., the ratio between the signal S14 and the output signal $\overline{So}$ is calculated, but a calculation method varies depending on the magnitude of the component amount of the spatial frequency u1. That is, the component amount S11 of u1 at the first imaging operation is compared with the component amount $\overline{So}$ of u1 at the second imaging operation by the discriminating circuit 67. If $\overline{So}$<S11, a calculation of S15=$\overline{So}$/S14 is performed. If $\overline{So}\geq$S11, a calculation of S15=S14/$\overline{So}$ is performed. In this manner, component ratios at the spatial frequencies u1, u2, and u3 are sequentially calculated, and are output from the divider 69. The signal S15 output from the divider 69 is converted into a digital signal by the A/D converter 70. At the same time, the latches 71 to 73 respectively supply signals Y21, Y22, and Y23, as the component ratios at the spatial frequencies u1, u2, and u3, to the electronic scanning circuit 37. Owing to the function of the latches, the sequentially calculated ratios Y21, Y22, and Y23 are simultaneously input to the electronic scanning circuit 37, and are held in the latches 71 to 73 until a defocus amount is detected. Similar to the first embodiment, the electronic scanning circuit 37 compares the ratios Y21, Y22, and Y23 with the prestored MTF ratios, calculates a defocus amount, and outputs a defocus signal D, as the calculation result, to the microprocessor 80. The microprocessor 80 calculates an accurate defocus amount on the basis of the defocus signal D, the discrimination signal J2, and the moving speed of the photographic optical system 10, and outputs a control signal C2 to the driving circuit 13 so as to control the speed and amount of movement of the photographic optical system 10. Driving control based on this control signal C2 is performed to move the photographic optical system 10, thus performing focus adjustment.

As described above, according to this embodiment, the same effect as that of the first embodiment can be obtained. In addition, since only one each of the image sensor 60, the BPF 62, the power detecting circuit 63, the divider 69, and the A/D converter 70 are required, the apparatus can be further reduced in size.

Since a spatial frequency component having a smaller defocus amount is always used as a denominator when an operation is performed in the divider 69, a high-precision value can always be obtained, and the precision of focus adjustment can be improved.

In the above-described embodiment, the three types of frequencies $\phi_1$, $\phi_2$, and $\phi_3$ are used as the read clock frequencies of the image sensor 60. However, other three types of frequencies may be used so as to be switched with the above three types of frequencies. Alternatively, a larger number of frequencies may be used. In addition, a combination of a CCD image sensor and a frame memory may be used in place of the non-destructive read access image sensor 60.

Figure 5:
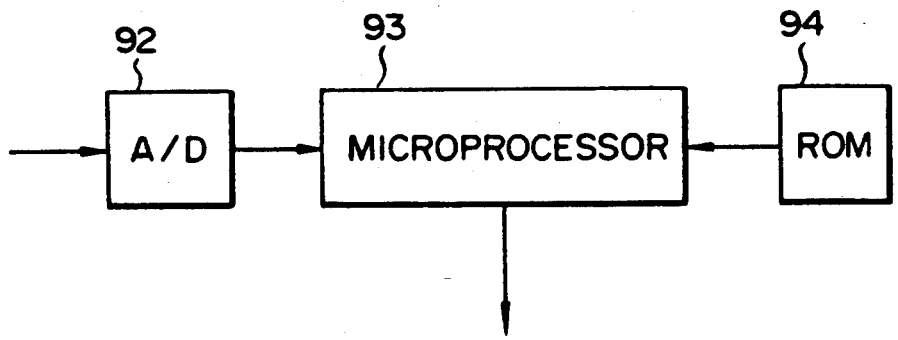
FIG. 5 is a block diagram showing a modification of the first and second embodiments.

The entire signal processing in the first and second embodiments may be performed by digital processing. More specifically, each of portions 90 and 91 indicated by alternate long and short dashed lines in FIGS. 1 and 4 may be constituted by an A/D converter 92, a microprocessor 93, and a ROM 94 in which a plurality of MTF ratios in the respective focusing states are stored, as shown in FIG. 5. In this arrangement, a focus adjusting operation is performed by the microprocessor 93. With this arrangement, the apparatus can be reduced in size.

Furthermore, in place of the microprocessor, another hardware arrangement for performing the same operation may be used.

Figure 15:
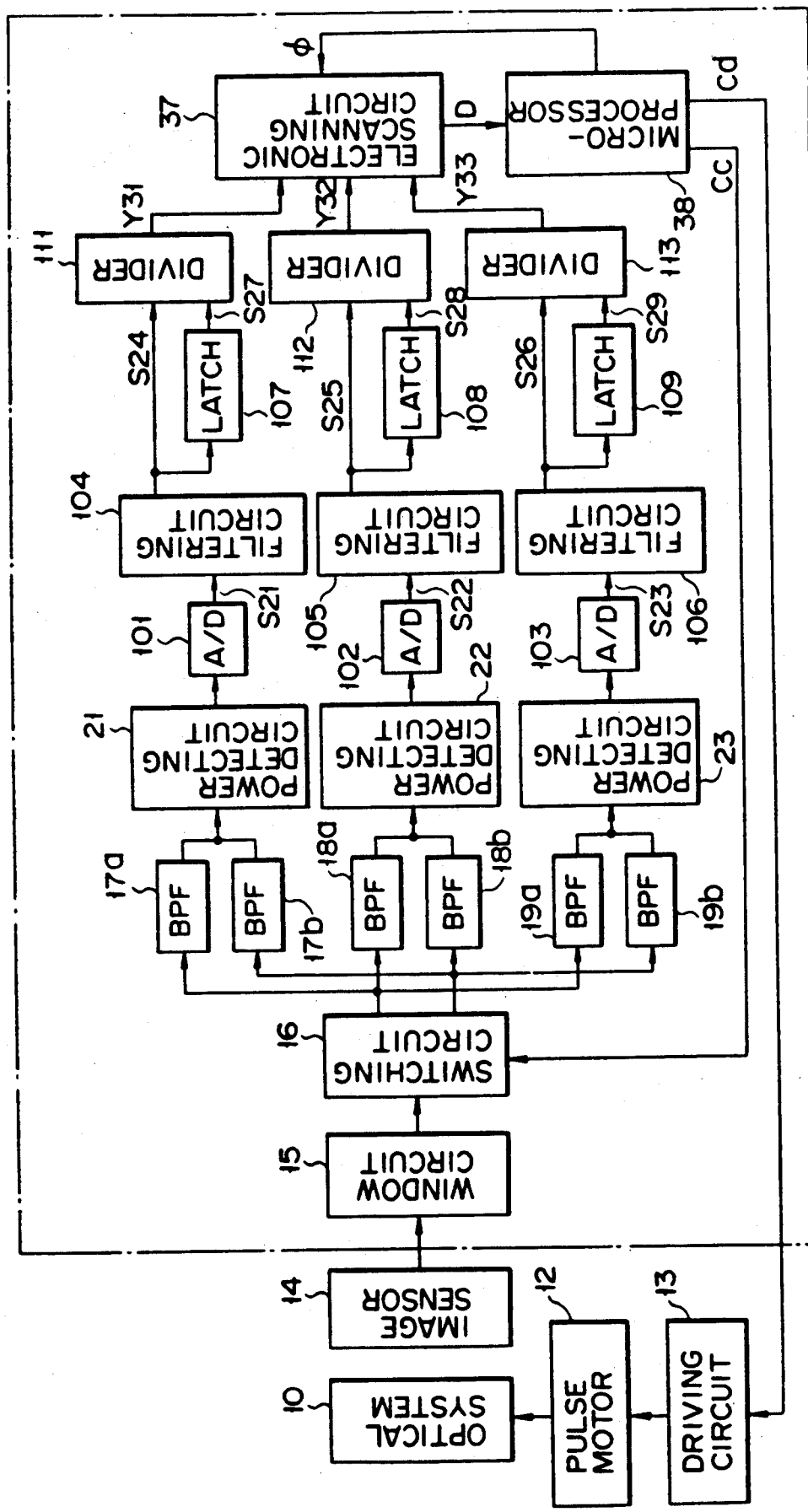
FIG. 15 is a block diagram showing an arrangement of the third embodiment of the present invention.

An automatic focusing apparatus according to the third embodiment of the present invention will be described below with reference to FIG. 15. In this embodiment, the sequence of processing in which the spatial frequency components of image signals formed by an imaging operation of an image sensor 14 are detected by the power detecting circuits 21 to 23 is performed in the same manner as in the apparatus shown in FIG. 1. The same reference numerals in FIG. 15 denote the same parts as in FIG. 1, and a detailed description thereof will be omitted.

In this embodiment, MTF ratios are calculated after the spatial frequency components of image signals detected by the power detecting circuits 21 to 23 are subjected to filtering processing. More specifically, A/D converters 101 to 103 are respectively connected to the power detecting circuits 21 to 23. Spatial frequency components detected by the power detecting circuits 21 to 23 are respectively A/D-converted by the A/D converters 101 to 103. The A/D converters 101 to 103 respectively output the A/D-converted spatial frequency components, as contrast signals S21 to S23, to filtering circuits 104 to 106 to which the A/D converters 101 to 103 are respectively connected. The filtering circuit 104 to 106 are respectively connected to dividers 111 to 113. The dividers 111 to 113 respectively receive signals S24 to S26 from the corresponding filtering circuits 104 to 106, and also receive, through latches 107 to 109, signals S27 to S29 which are respectively output from the filtering circuits 104 to 106. The dividers 111 to 113 respectively divide the signals S24 to S26 directly supplied from the filtering circuits 104 to 106 by the signals S27 to S29 supplied through the latches 107 to 109, and output spatial frequency component ratios Y31 (=S24/S27), Y32 (=S25/S28), and Y33 (=S26/S29) to the electronic scanning circuit 37.

FIGS. 16 to 18 respectively show circuit arrangements of each of the filtering circuits 104 to 106. In the respective drawings, reference symbol f(x) denotes an input; and g(x), an output. In the filtering circuit shown in FIG. 16, a plurality of delay elements T are series-connected to the input, and the outputs of the delay elements T are respectively connected to an adder through multipliers in which filter coefficients $\omega_1$ to $\omega_m$ are set.

In the filtering circuit shown in FIG. 17, adders are respectively connected between a plurality of series-connected delay elements T. In this arrangement, the input f(x) is input to the respective adders through multipliers in which filter coefficients $\omega_1$ to $\omega_m$ are set.

The filtering circuit shown in FIG. 18 can be used when a filter coefficient $\omega$ is "1". In this circuit, the input f(x) is input to a FIFO memory and is sequentially delayed, and an output from the FIFO memory is sequentially subtracted from the input f(x). This subtraction result is input to an adder and is added to a signal from a latch connected to the output side of the adder.

The filter coefficients and the spectra of the filter functions of the filtering circuits having the above-described arrangements will be described below with reference to FIGS. 19A to 20B.

FIGS. 19A and 20A respectively show a rect function and a spline function, which are respectively represented by the following formulae:

rect(x/a): $|x| \leq a/2$  rect(x/a) = 1

$|x| > a/2$  rect(x/a) = 0 spline(x/a): $|x| \leq a/2$  spline(x/a) = $x^3 - 2x^2 + 1$ $a/2 < |x| \leq a$  spline(x/a) = $-x^3 - 5x^2 - 8x + 4$ $|x| > a$  spline(x/a) = 0

FIG. 19B is a graph showing the spectrum of the rect function in FIG. 19A. FIG. 20B is a graph showing the spectrum of the spline function in FIG. 20A. As shown in FIGS. 19A to 20B, both the rect function and the spline function serve as low-pass filters. When filtering is to be performed by using the rect function, filter coefficients indicated by black dots in FIG. 19A are used, provided that six values of the input f(x), for example, are to be filtered. When filtering is to be performed by using the spline function, filter coefficients indicated by black dots in FIG. 20A are used, provided that 12 values of the input f(x), for example, are filtered. Note that if the filter coefficients $\omega_1$ to $\omega m=1$, and the rect function is used, since signals are simply added together, the filter circuit shown in FIG. 18 is preferably used.

A function of this embodiment will be described below.

Figure 21:
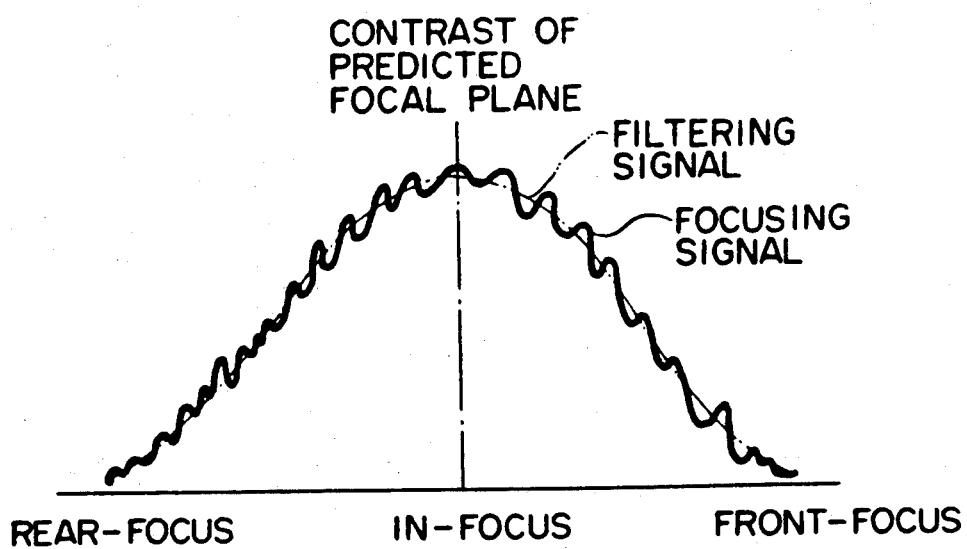
FIG. 21 is a graph showing contrast signals before and after filtering is performed near the predicted focal plane.

In this embodiment, the sequence of processing in which images formed by the photographic optical system are detected by the image sensor 14, and the spatial frequency components of the image signals of the detected images are detected by the power detecting circuits 21 to 23 is the same as that in the first embodiment. Therefore, a description will be started from the step after the spatial frequency components are respectively detected by the power detecting circuits 21 to 23. The spatial frequency components detected b the power detecting circuits 21 to 23 are respectively converted into digital signals by the A/D converters 101 to 103 and are input, as contrast signals S21 to S23, to the corresponding filtering circuits 104 to 106. The filtering circuits 104 to 106 sequentially receive the contrast signals S21 to S23 corresponding to the even-numbered and odd-numbered field signals each at a rate of one signal per field. The input contrast signals S21 to S23 are filtered as the inputs f(x) shown in FIGS. 16 to 18. As a result, each of the contrast signals S21 to S23 is converted from a signal with noise indicated by a solid curve to a signal, indicated by a dotted curve, whose ripples are restricted, as shown in FIG. 21. Hence, the contrast signals S21 to S23 are output as contrast signals S24 to S26 each having an improved S/N ratio. The contrast signals S24 to S26 output from the filtering circuits 104 to 106 are respectively input to the dividers 111 to 113, and are simultaneously input to the latches 107 to 109. Each of the latches 107 to 109 has a function of selecting two arbitrary signals from the signals filtered by a corresponding one of the filtering circuits 104 to 106. The latch timings of the latches 107 to 109 are adjusted to obtain contrast signals S27 to S29 representing different focusing states having arbitrary optical path length differences. Subsequently, contrast signals S27 to S29 representing focusing states different from those represented by the contrast signals S24 to S26 are respectively input to the dividers 111 to 113. The dividers 111 to 113 respectively output signals Y31 (=S24/S27), Y32 (=S25/S28), and Y33 (=S26/S29) to the electronic scanning circuit 37.

Since the function of this embodiment is the same as that of the first embodiment, a description thereof will be omitted.

As described above, according to this embodiment, since the contrast signals S24 to S26 obtained by A/D-converting the spatial frequency components are filtered by the filtering circuits 104 to 106, the S/N ratios of the contrast signals can be improved, and the focusing precision can be greatly improved.

In the third embodiment, the filtering circuits 104 to 106 are constituted by digital filters. However, even if they are constituted by analog filters, the specific function and effect of the third embodiment can be obtained.

The fourth embodiment of the present invention will be described below.

Figure 22:
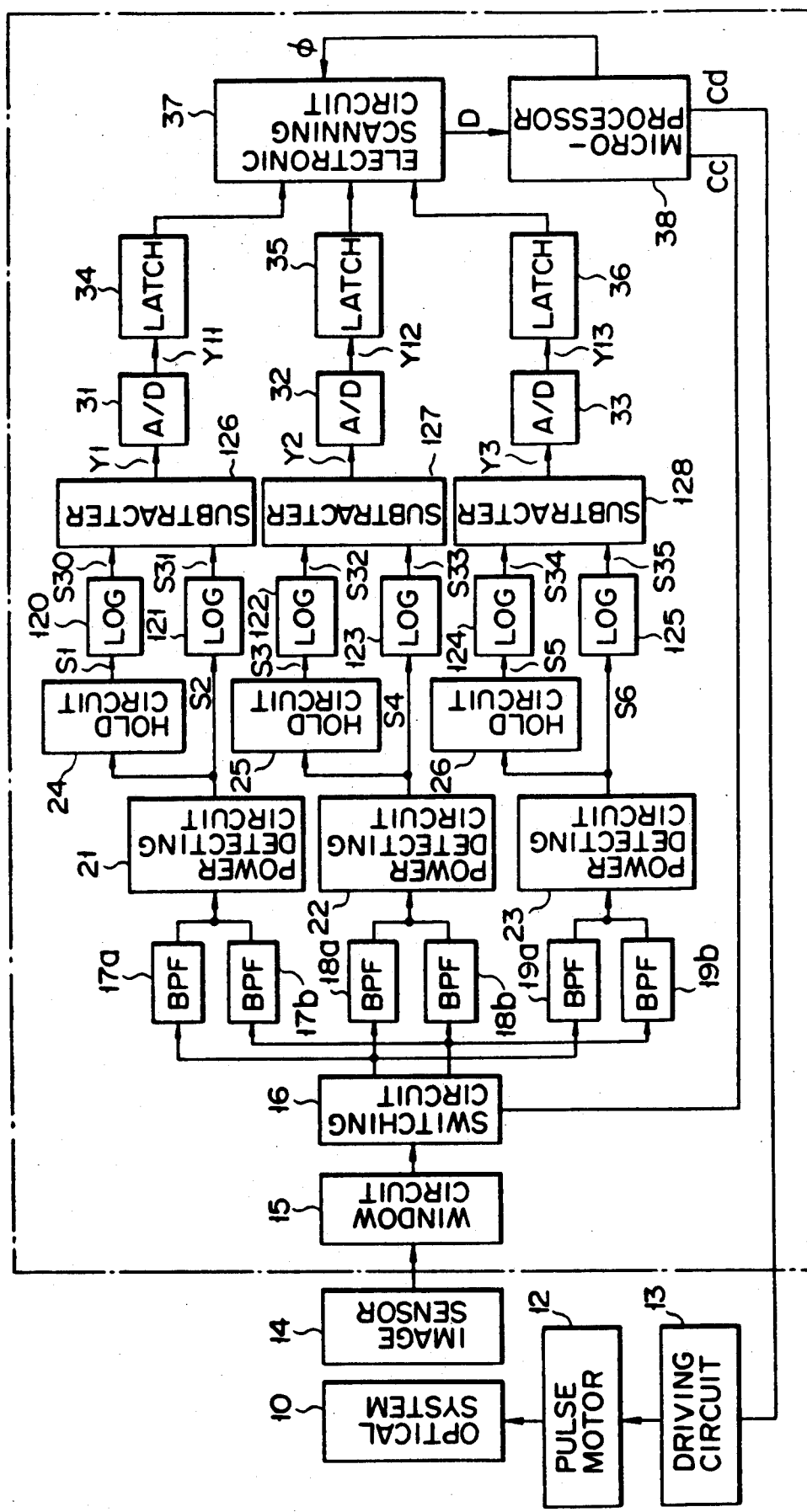
FIG. 22 is a block diagram showing a arrangement of the fourth embodiment of the present invention.
Figure 24:
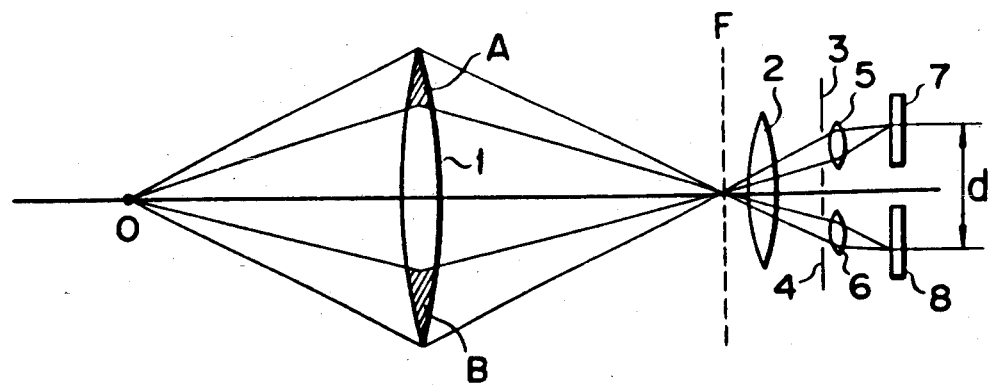
FIG. 24 is a view for explaining the phase correlation scheme.
Figure 25:
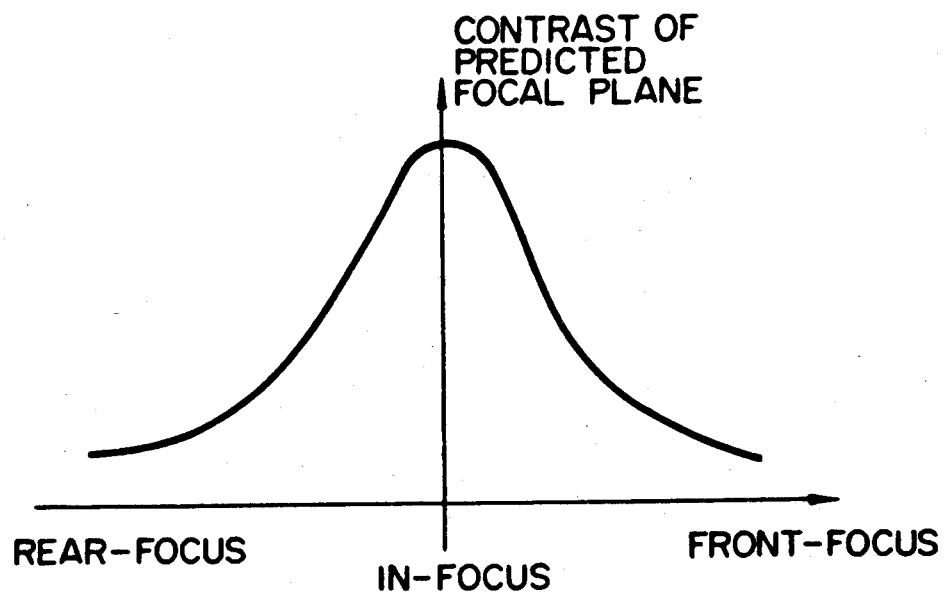
FIG. 25 is a graph for explaining the hill-climbing scheme.

FIG. 22 shows an arrangement of an automatic focusing apparatus according to the fourth embodiment of the present invention. Note that the same reference numerals in FIG. 22 denote the same parts as in FIG. 1.

In this embodiment, an MTF ratio function $r(u;\delta_1,\delta_2)$ is defined as follows:

$$r(u; \delta_1, \delta_2) = \log\left(\frac{G_1(u)}{G_2(u)}\right) = \log\left(\frac{M(u, \delta_1)}{M(u, \delta_2)}\right) \quad (7)$$
$$= \log M(u, \delta_1) - \log M(u, \delta_2)$$

Figure 23:
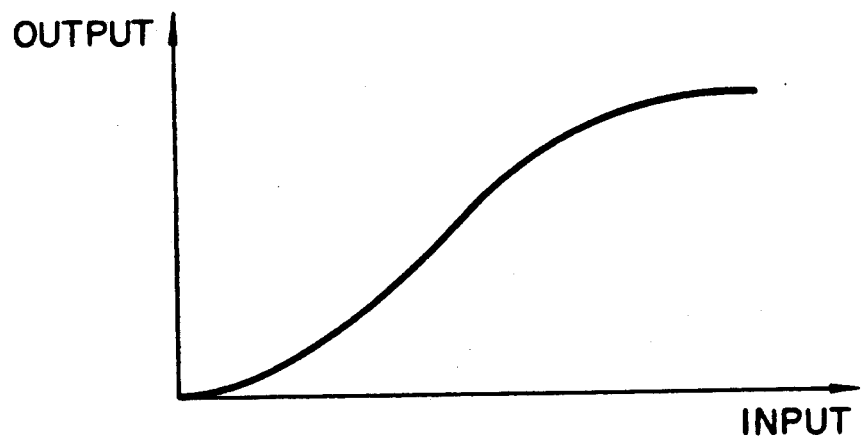
FIG. 23 is a graph showing input/output characteristics of a logarithmic circuit.

In addition, a logarithmic circuit having input/output characteristics shown in FIG. 23 is used as a "log function".

In this embodiment, logarithmic circuits 120 to 125 each having the input/output characteristics shown in FIG. 23 are respectively connected to the outputs of power detecting circuits 21 to 23 and hold circuits 24 to 26. The logarithmic circuits 120 to 125 constitute pairs respectively including the power detecting circuits 120 to 125. These pairs are respectively connected to subtracters 126 to 128. The subtracters 126 to 128 are respectively connected to A/D converters 31 to 33. Differences in logarithm of MTFs calculated according to equation (7) are stored in ROMs 41 to 43 of the electronic scanning circuit 37.

A function of this embodiment will be described below.

In this embodiment, the sequence of processing in which images formed by the photographic optical system are detected by the image sensor 14, and the spatial frequency components of the image signals of the detected images are respectively output, as contrast signals S1 to S6, from the power detecting circuits 21 to 23 and the hold circuits 24 to 26 is the same as that in the first embodiment, and hence a description thereof will be omitted.

Contrast signals S2, S4, and S6 from the power detecting circuits 21 to 23 are respectively input to the logarithmic circuits 121, 123, and 125, and are also input to the hold circuits 24 to 26. The contrast signals input to the hold circuits 24 to 26 are held for a predetermined period of time, and are subsequently supplied to the corresponding logarithmic circuits 120, 122, and 124. As a result, contrast signals representing different focusing states are input to the pairs of the logarithmic circuits 120 and 121, 122 and 123, and 124 and 125, each of which is connected to the same subtracter. Signals S30 to S35 output from the logarithmic circuits 120 to 125 are respectively input to the subtracters 126 to 128. The subtracters 126 to 128 respectively perform subtractions of Y1=S30-S31, Y2=S32-S33, and Y3=S34-Y35, and output differential signals Y1 to Y3, as subtraction results, to the corresponding A/D converters 31 to 33. The signals output from the A/D converters 31 to 33 are held by the latches 34 to 36 for a predetermined period of time, and are subsequently output to the electronic scanning circuit 37. Subsequently, a defocus amount is detected in the same manner as in the first embodiment.

As described above, according to this embodiment, since the MTF ratio function $r(u;\delta_1,\delta_2)$ is defined by equation (7), and the logarithmic circuits 120 to 125 each having the input/output characteristics shown in FIG. 23 are used, focus adjustment can be performed in the same manner as in the first to third embodiments without using any divider. In addition, even if the divisor of an MTF ratio is 0 (e.g., $M(u,\delta_1)=0$), a calculation of an MTF ratio function can be performed without any calculation error, and hence the focusing precision can be improved.

In the fourth embodiment logarithmic operations are used in place of divisions. However, any other operation means can be used as long as it can extract the characteristics of two contrast signals.

What is claimed is:

1. An automatic focusing apparatus, comprising:
   an optical system, having a predetermined focal plane and an optical axis, for forming an optical image of an object;
   means for moving said focal plane in a direction of the optical axis;
   storage means for storing MTF (Modulation Transfer Function) ratios, defocus amounts, focusing directions, and focusing states corresponding to the MTF ratios, said MTF ratios being ratios of first MTF values corresponding to a plurality of first spatial frequencies at a first position near the focal plane to second MTF values corresponding to a plurality of second spatial frequencies at a second position near the focal plane;
   an image sensor for detecting the optical image of the object formed by said optical system with said focal plane being moved, and for outputting image signals;
   spatial frequency component extracting means for extracting a plurality of spatial frequency components corresponding to the plurality of spatial frequencies from the image signals output from said image sensor;
   calculating means for extracting spatial frequency components in two different focusing states of said optical system from the plurality of spatial frequency components extracted by said spatial frequency component extracting means, and calculating a ratio between the spatial frequency components in different focusing states at every common frequency;
   defocus detecting means for comparing the spatial frequency component ratios calculated by said calculating means with the MTF ratios stored in said storage means, determining a focusing state of said optical system, and detecting a defocus amount and a focusing direction in the determined focusing state; and
   driving control means for calculating an amount and a direction of movement of said focal plane on the basis of the defocus amount and the focusing direction detected by said defocus detecting means, and for outputting the calculation result to said moving means to move the focal plane to a focusing point.

2. An apparatus according to claim 1, wherein aid calculating means comprises a plurality of hold circuits for holding the plurality of spatial frequency components output from said spatial frequency component extracting means for a predetermined period of time, and dividing means of dividing the respective spatial frequency components output from said plurality of hold circuits by the spatial frequency components at the common frequencies output from said spatial frequency component extracting means.

3. An apparatus according to claim 1, wherein said calculating means comprises a plurality of hold circuits for holding the plurality of spatial frequency components output from said spatial frequency component extracting means for a predetermined period of time, a plurality of logarithmic circuits for respectively performing logarithmic conversion of the outputs from said plurality of hold circuits and the plurality of spatial frequency components output from said spatial frequency component extracting means, and a plurality of subtracters for respectively subtracting the spatial frequency components at the common frequencies from the outputs from said plurality of logarithmic circuits.

4. An apparatus according to claim 1, wherein said calculating means comprises a plurality of A/D-converting means for respectively A/D-converting the plurality of spatial frequency components from said spatial frequency component extracting means to generate outputs, a plurality of filtering circuits for respectively filtering the outputs from said plurality of A/D-converting means to generates filtered outputs, a plurality of latches for respectively holding the filtered outputs from said plurality of filtering circuits for a predetermined period of time and subsequently outputting the filtered outputs, and a plurality of dividing means for respectively dividing the outputs from said plurality of latches and the outputs from said plurality of filtering circuits by spatial frequency components at common frequencies.

5. An apparatus according to claim 1, wherein said defocus detecting means comprises an electronic scanning circuit for comparing the spatial frequency component ratios with the MTF ratios by electronic scanning, and detecting a defocus amount and a defocus direction representing a focusing state of said optical system.

6. An apparatus according to claim 1, wherein said image sensor comprises a two-dimensionally interlined transfer scheme image sensor having even-numbered and odd-numbered fields, said image sensor detecting the optical image of the object in one of the different focusing states with the even-numbered fields, detecting the optical image of the object in the other focusing state with the odd-numbered fields, and outputting the detected images as image signals, respectively.

7. An apparatus according to claim 4, wherein each of said plurality of filtering circuits comprises a plurality of series-connected delay elements including a first stage delay element for receiving the output from said A/D-converting means, said delay elements generating respective outputs, a plurality of multipliers for multiplying the outputs from said delay elements by a predetermined filter coefficients, respectively, and outputting a result values, and an adder for adding the result values from said multipliers and outputting an addition result.

8. An apparatus according to claim 4, wherein each of said filtering circuits comprises a plurality of multipliers for multiplying each of the input spatial frequency components by predetermined coefficients and outputting result values, said multipliers including a first stage multiplier, a plurality of delay elements including a first stage delay element connected to the first stage multiplier for delaying the result value from said first stage multiplier, said delay elements producing delayed outputs, and a plurality of adders each for adding the output from preceding one of said delay elements to the output from the corresponding one of said multipliers.

9. An apparatus according to claim 4, wherein each of said filtering circuits comprises a FIFO memory for sequentially receiving spatial frequency components and sequentially outputting previously input spatial frequency components upon reception of the spatial frequency components in the order of reception, subtracting means for subtracting the spatial frequency components from said FIFO memory from the spatial frequency components input from said extracting means and outputting result signals, and adding means for sequentially adding the result signals from said subtracting means.

10. An apparatus according to claim 1, wherein each of first and second spatial frequencies includes low-frequency and high-frequency components, said storage means stores MTF ratios corresponding to the low-frequency and high-frequency components of the first spatial frequencies, and MTF ratios corresponding to the low-frequency and high-frequency components of the second spatial frequencies, and
   said spatial frequency component extracting means comprises means for extracting the low and high spatial frequency components and separately outputting the respective frequency components, and switching means for switching the low and high frequencies.

11. An automatic focusing apparatus, comprising:
an optical system, having a predetermined focal plane and an optical axis, for forming an optical image of an object;
means for moving said focal plane in a direction of the optical axis;
storage means for storing MTF ratios, defocus amounts, focusing directions, and focusing states corresponding to the MTF ratios, said MTF ratios being ratios of first MTF values corresponding to a plurality of first spatial frequencies at a first position near the focal plane to second MTF values corresponding to a plurality of second spatial frequencies at a second position near the focal plane;
a nondestructive read access image sensor for detecting the optical image of the object formed by said optical system with said focal plane being moved, and for outputting image signals;
spatial frequency component extracting means for reading the image signal of the same optical image from said image sensor a plurality of times with a read clock frequency being changed, extracting spatial frequency components corresponding to the plurality of spatial frequencies from the plurality of read image signals, and outputting the extracted components;
hold means for holding the plurality of spatial frequency components extracted by said spatial frequency component extracting means for a predetermined period of time, and subsequently outputting the spatial frequency components;
calculating means for calculating the plurality of spatial frequencies output from said hold means and the plurality of spatial frequency components from said spatial frequency component extracting means at every common frequency, to obtain ratios between the spatial frequency components in different focusing states of said optical system;
defocus detecting means for comparing the spatial frequency component ratios calculated by said calculating means with the MTF ratios stored in said storage means, determining a focusing state of said optical system, and detecting a defocus amount and a focusing direction in the determined focusing state; and
driving control means for calculating an amount and a direction of movement of said focal plane from the defocus amount and the focusing direction detected by said defocus detecting means, and for outputting the calculation result to said moving means to move the focal plane to a focusing point.

* * * * *

UNITED STATES PATENT AND TRADEMARK OFFICE
CERTIFICATE OF CORRECTION

PATENT NO. : 5,070,353

DATED : December 3, 1991

INVENTOR(S) : KOMIYA et al

It is certified that error appears in the above-identified patent and that said Letters Patent is hereby corrected as shown below:

Column 19, line 51 (claim 2), change "aid" to read --said--.

Signed and Sealed this

Eleventh Day of February, 1997

Attest:

Attesting Officer

BRUCE LEHMAN

Commissioner of Patents and Trademarks